(12) United States Patent
Gupta

(10) Patent No.: US 12,362,844 B2
(45) Date of Patent: Jul. 15, 2025

(54) SYSTEM AND METHOD FOR VISUALLY MONITORING MEDIA STREAMS

(71) Applicant: Triveni Digital, Inc., Princeton, NJ (US)

(72) Inventor: Jimmy Rohit Gupta, Southampton, NJ (US)

(73) Assignee: Triveni Digital Inc., Princeton, NJ (US)

( * ) Notice: Subject to any disclaimer, the term of this patent is extended or adjusted under 35 U.S.C. 154(b) by 0 days.

(21) Appl. No.: 18/293,035

(22) PCT Filed: Aug. 2, 2022

(86) PCT No.: PCT/US2022/039109
§ 371 (c)(1),
(2) Date: Jan. 29, 2024

(87) PCT Pub. No.: WO2023/014676
PCT Pub. Date: Feb. 9, 2023

(65) Prior Publication Data
US 2024/0267141 A1     Aug. 8, 2024

Related U.S. Application Data

(60) Provisional application No. 63/229,160, filed on Aug. 4, 2021.

(51) Int. Cl.
*H04H 20/12*     (2008.01)
*H04N 21/431*    (2011.01)

(52) U.S. Cl.
CPC .......... *H04H 20/12* (2013.01); *H04N 21/431* (2013.01)

(58) Field of Classification Search
None
See application file for complete search history.

(56) References Cited

U.S. PATENT DOCUMENTS

| | | | |
|---|---|---|---|
| 7,215,360 B2 | 5/2007 | Gupta | |
| 2004/0181818 A1* | 9/2004 | Heyner | H04N 21/4751 725/116 |
| 2006/0218587 A1 | 9/2006 | Kelts | |
| 2009/0177585 A1 | 7/2009 | Eskicioglu et al. | |

(Continued)

*Primary Examiner* — James R Marandi
(74) *Attorney, Agent, or Firm* — David Todd Shoneman; Michael A. Pugel

(57) ABSTRACT

An apparatus and method for dynamically monitoring at least one media stream in a signal communication system are described. They include receiving at least one media stream, wherein the media stream(s) are capable of being monitored at a plurality of locations and selecting at least one characteristic associated with the media stream(s) in response to a first user input. They also include generating a first display component in a graphical user interface (GUI), including a visual representation of the at least one characteristic for a first received media stream and generating a second display component in the GUI in response to a second user input, including a visual representation of the at least one characteristic for a second received media stream that is related to the first received media stream, wherein the second display component is dynamically updated in response to a change in the first display component.

20 Claims, 8 Drawing Sheets

(56) References Cited

U.S. PATENT DOCUMENTS

| | | |
|---|---|---|
| 2010/0031162 A1* | 2/2010 | Wiser .................. H04N 21/431 |
| | | 715/747 |
| 2013/0019263 A1 | 1/2013 | Ferren et al. |
| 2015/0229870 A1* | 8/2015 | Kim .................. H04N 21/4882 |
| | | 348/552 |
| 2017/0060388 A1 | 3/2017 | Einaudi |
| 2017/0255367 A1 | 9/2017 | Lewis et al. |
| 2021/0048927 A1 | 2/2021 | Bowrin et al. |

* cited by examiner

SYSTEM AND METHOD FOR VISUALLY MONITORING MEDIA STREAMS

This application claims the benefit, under 35 U.S.C. § 365 of International Application PCT/US2022/039109, filed Aug. 2, 2022, which was published in accordance with PCT Article 21 (2) on Feb. 9, 2023, in English and which further claims the benefit of provisional application US63/229160, filed on Aug. 4, 2021.

TECHNICAL FIELD

The present disclosure generally relates to communications systems, such as a digital television broadcast system, for the development, testing, troubleshooting, control and operation of facilities and networks for broadcasting media content, and more specifically to a technique of displaying data and information at varying levels of granularity using a tree-like structure, which is usable to monitor and analyze signals in those systems.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure.

The advent of advanced broadcast signal transmission standards, such as the Advanced Television Systems committee (ATSC) 3.0 set of standards, and the corresponding transmission technologies makes manipulation of the data streams more difficult across broadcast content distribution networks than in previous networks that use legacy broadcast signal transmission standards, such as ATSC 1.0. Many television distribution networks using the advanced standards rely on a variety of technologies to move the media content that will ultimately constitute the television broadcast from the origination point, typically the main studio, to the transmission antenna.

The operators of the television broadcast facilities that provide signals into the broadcast content distribution networks need a way to verify that their digital broadcast signal (i.e., multiplex or data stream) is within standards described by one of several broadcast standards organizations, such as ATSC or any other applicable standard, in order to maintain interoperability. A data stream in a digital television (DTV) broadcast environment is very complex and is generated by a battery of equipment such as encoders, program and system information protocol (PSIP) generators, data servers, motion picture experts group (MPEG) standard MPEG-2 packet generators, multiplexers, etc.

Furthermore, it is often difficult for operators to determine whether or not their data stream is correct, even if they have an instrument that allows them to examine and also compare the properties of the signals or streams at the various layers within the system. Most operators or users have great difficulty using existing stream monitoring and analysis tools because of their complexity and non-intuitive user interface. The software applications used with the monitoring device often have configurable user interface components, but those customizations are usually limited to color & fonts.

Currently, there is no known easy way to generate a customizable user interface for monitoring multiple parameters of various elements that may be operationally linked in a complex broadcast or streaming environment as the properties of these elements (such as names, types, locations, etc.) are constantly changing or unknown. As a result, there is a need for a mechanism that allows users to create custom user interface panels for display that can be configured to monitor, analyze, and determine operational compliance of elements in a broadcast, streaming, or other signal communication system.

SUMMARY

According to one implementation, an apparatus for dynamically monitoring at least one media stream in a signal communication system is described. The apparatus includes an input interface that receives at least one media stream. The at least one media stream is capable of being monitored at a plurality of locations. The apparatus also includes a memory coupled to the input interface and a processor coupled to the input interface and memory. The processor is configured to select at least one characteristic associated with the at least one media stream in response to a first user input, generate for display a first display component in a graphical user interface (GUI), the first display component including a visual representation of the at least one characteristic for a first received media stream, and generate for display a second display component in the GUI in response to a second user input, the second display component including a visual representation of the at least one characteristic for a second received media stream that is related to the first received media stream. The visual representation of the second display component is dynamically updated in response to a change in the visual representation of the first display component.

According to another implementation, a method for dynamically monitoring at least one media stream in a signal communication system is described. The method includes receiving at least one media stream, wherein the at least one media stream is capable of being monitored at a plurality of locations and selecting at least one characteristic associated with the at least one media stream in response to a first user input. The method also includes generating for display a first display component in a graphical user interface GUI, the first display component including a visual representation of the at least one characteristic for a first received media stream and generating for display a second display component in the GUI in response to a second user input, the second display component including a visual representation of the at least one characteristic for a second received media stream that is related to the first received media stream. The second display component is dynamically updated in response to a change in the first display component.

According to another implementation, a non-transitory computer-readable medium is described. The non-transitory computer-readable medium having stored thereon a set of programming instructions that, when executed by at least one processor, performs the steps of receiving at least one media stream, the at least one media stream capable of being monitored at a plurality of locations and selecting at least one characteristic associated with the at least one media stream in response to a first user input. The processor further performs the steps of generating for display a first display component in a GUI, the first display component including a visual representation of the at least one characteristic of a first received media stream and generating for display a second display component in the GUI in response to a second user input, the second display component including a visual representation of the at least one characteristic of a second received media stream that is related to the first received media stream. The second display component is dynamically updated in response to a change in the first display component.

BRIEF DESCRIPTION OF THE DRAWINGS

The above and other aspects, features, and advantages of the present disclosure will become more apparent in light of the following detailed description when taken in conjunction with the accompanying drawings to which the principles of the present disclosure are applicable.

DETAILED DESCRIPTION

Figure 1:
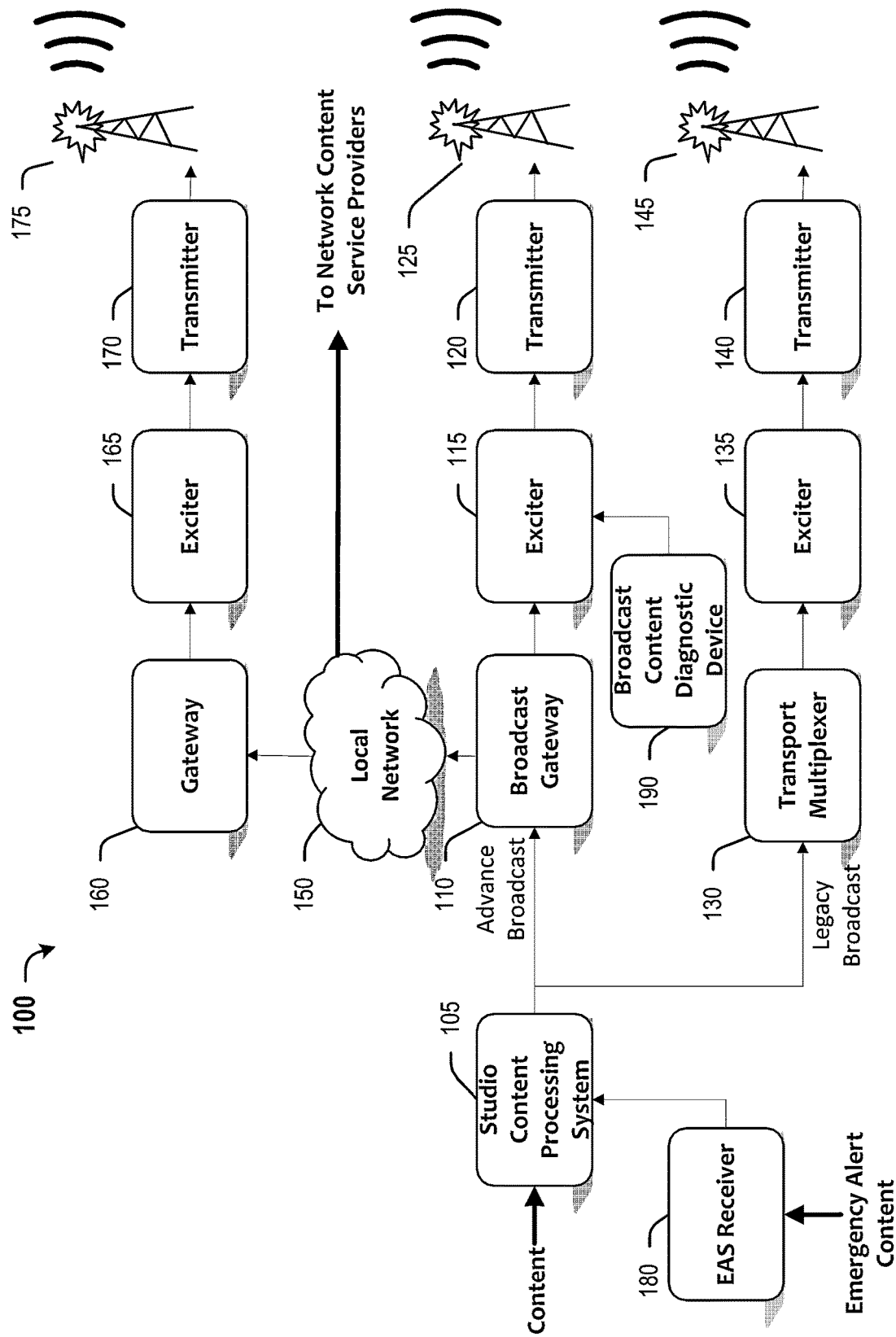
FIG. 1 is a block diagram of an exemplary broadcast content distribution system, according to aspects of the present disclosure.

It should be understood that the elements shown in the figures may be implemented in various forms of hardware, software, or combinations on one or more appropriately programmed general-purpose devices, which may include a processor, memory, and input/output interfaces. Those skilled in the art will be able to devise various arrangements which, although not explicitly described or shown herein, embody the principles of the disclosure and are included within its scope.

All examples recited herein are intended to aid the reader in understanding the principles of the disclosure and the concepts and are to be construed as being without limitation to such specifically recited examples and conditions. Any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a system on a chip (SoC), digital signal processor ("DSP") hardware, read only memory ("ROM") for storing software, random access memory ("RAM"), and nonvolatile storage.

As used herein, the term "processor" broadly refers to and is not limited to a single- or multi-core general purpose processor, a special purpose processor, a processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), an SOC, and/or a state machine. As used herein, the terms "transaction" and "electronic transaction" broadly refer to any transaction which may be electronically validated by the recited system, method, and apparatus.

One or more of the aspects of the embodiments described above may be implemented using application-specific hardware. Further, one or more aspects of the embodiments may be implemented using one or more processing elements, such as central processing units (CPUs) that may include specific operating instructions embedded as firmware in the processing element(s) or may operate from software code that is downloaded into the elements from one or more memory units coupled to the processing element(s).

The present disclosure addresses issues related to displaying characteristics or information about multiple signals, such as audio streams, video streams, and data streams, using a visual display interface, such as a graphical user interface (GUI), during a process of monitoring and/or analyzing those signals, such as when performing diagnostics or maintenance on any component or subsystem in a signal communication system. In some situations, it is desirable to have changes made to characteristics or operating parameters associated with the display of one or more of the signals affect those same changes on the parameters or operating parameters associated with some or all of the other signals. The operator or technician (hereinafter "operator") normally has to make the changes to each of the characteristics or operating parameters associated with each of the signals separately. Depending on the number of signals involved, the process results in loss of efficiency, inability to capture a diagnostic or maintenance error in a timely fashion, or incorrect diagnostic data as a result of an entry error with the changes due to complexity.

Accordingly, the present disclosure provides a method and apparatus for visually monitoring signals as media streams that provides a mechanism to link characteristics and operating parameters between different display elements associated with the media streams. The linking approach, which primarily relies on relationships that are established between the signals or media streams, effectively communicates condition and operating information between the display elements, overcoming some of the issues described above. Specifically, by establishing a tree node hierarchy between the signals or media streams for the various elements identified in a signal communication system, the operator can create wildcard filtering and/or searching for the characteristics and operating parameters within a hierarchical format and associate the results with a display layout that will automatically update results when certain element properties or displays associated with those elements change. Further, the mechanism may be configured for analysis and/or comparison of signals or media streams at various points in the signal communication path.

Advantages of the present disclosure will become more apparent from the detailed description given hereinafter. However, it should be understood that the detailed description and specific examples, while indicating preferred embodiments of the present disclosure, are given by way of illustration only, since various changes and modifications within the scope of the present disclosure will become apparent to those skilled in the art from this detailed description.

FIG. 1 illustrates a block diagram of an exemplary broadcast content distribution system 100 according to aspects of the present disclosure. In broadcast content distribution system 100, content from one or more content sources is provided to studio content processing system 105. Studio content processing system 105 is coupled to broadcast gateway 110. Broadcast gateway 110 is coupled to exciter 115. Exciter 115 is coupled to transmitter 120. Transmitter 120 is coupled to the transmitter antenna 125, which radiates a broadcast signal provided from transmitter 120 into the airwaves. Studio content processing system 105 is also coupled to transport multiplexer 130. Transport multiplexer 130 is coupled to exciter 135. Exciter 135 is coupled to transmitter 140. Transmitter 140 is coupled to the transmitter antenna 145, which radiates a broadcast signal provided from transmitter 140 into the airwaves. Broadcast gateway 110 is also coupled to gateway 160 through local network 150. Gateway 160 is coupled to exciter 165. Exciter 165 is coupled to transmitter 170. Transmitter 170 is coupled to the transmitter antenna 175, which radiates a broadcast signal provided from transmitter 170 into the airwaves. Local network 150 also interfaces with one or more network content service providers to provide data representing studio content to users of the network content services. Emergency alert content from one or more emergency alert sources is provided to emergency alert system (EAS) receiver 180. EAS receiver is coupled to studio content processing system 150. DTV diagnostic device 190 is coupled to ATSC 3.0 exciter 115.

Most broadcast signals, as well as many communication signals, rely on a set of standards in order to maintain compatibility between the signal transmission and the signal receivers used for receiving the signal transmission. Most standards further implement the communication structures within various elements and signals based on protocol layers, starting at the physical radio frequency (RF) layer, referred to as the physical (PHY) layer, and moving lower through to the network layer, transport layer, and finally, the lowest or application layer. Aspects of the present disclosure utilize the various relationships that can exist between various elements and signals of each of the protocol layers.

Nominally, the studio content processing system 105, broadcast gateway 110, exciter 115, transmitter 120, and antenna 125 are collocated (e.g., in the same building or facility) and represent a broadcast signal transmission mechanism for delivering broadcast signals for use by the public within a first geographic area. As such, the transmitter 120 is configured as the main or original transmission source of a broadcast signal. Further, the transport multiplexer 130, exciter 135, transmitter 140, and transmitter antenna 145 may also be collocated at or near the same geographic location and provide the same or similar broadcast signals but using a different transmission format. Additionally, gateway 160, exciter 165, transmitter 170, and transmitter antenna 175 may be collocated at a geographic location that is different from the location of the elements mentioned above and may represent a broadcast signal transmission mechanism for delivering broadcast signals for use by the public within a second or different geographic area using either the same or a different transmission format. It is worth noting that the configuration of broadcast content distribution system 100 represents one or many possible configurations which may take advantage of the principles of the present disclosure.

Media content (e.g., audio, video, and/or data signals) as well as data associated with the media content is received by studio content processing system 105. The studio content processing system 105 may include one or more devices for processing media content for delivery and/or transmission through broadcast content distribution system 100. The studio content processing system 105 may include, but is not limited to, encoders, packagers, signal converters, and the like. The media content may be provided from one or more media content sources including, but not limited to, content production studios, content distribution companies, broadcast content providers, and the like. Media content may also be provided from alternative content sources such as websites, content subscription service companies and interactive applications providers. Data content may also be provided by one or more of the above-mentioned content sources as well as from specific data content sources such as media content listing or content guide services companies. The media content and/or the data content may be provided as raw digital data that is unencoded and unencrypted, particularly with respect to any broadcast standard protocols. The studio content processing system 105 processes the media and data content from the various content sources to produce one or more content streams. The content streams may be encoded and/or compressed using one or more media content encoding or compression protocols including but not limited to, MPEG 2, MPEG-4, MPEG-4 advanced video coding (AVC), and MPEG-H Part-2 high efficiency video coding (HEVC). Some of these content streams may further be formatted into internal protocol packets based on any one of several possible network friendly protocols. For example, the streams may be formatted as Real-time Transport Protocol (RTP)/User Datagram Protocol (UDP)/internet protocol (IP) multicast streams as part of data source layer processing. In some embodiments using ATSC 3.0 transmission standards, the streams may be formatted as Real-time Object Delivery over Unidirectional Transport (ROUTE) or MPEG Media Transport (MMT) packets. Some of these multicast streams allow the IP packets destined for broadcast signal receivers to be tunneled through any IP network without need to provide special routing or other consideration for the receiver IP address space. Tunneling is a networking mechanism that allows data in any format across diverse networks. In some embodiments, the content streams are further formatted using a data source transport protocol (DSTP) as described in the ATSC standard A/324.

One or more of the content streams from studio content processing system 105 are provided to broadcast gateway 110 as part of an advance broadcast communication. Broadcast gateway 110 processes the one or more content streams and formats the signals into a broadcast signal transport stream. Broadcast gateway 110 processes one or more of several different types of elementary streams that may include packet formatting that is consistent with delivery as IP packets but can be adapted for delivery in a broadcast transport stream. As such, the processing in broadcast gateway 110 includes encapsulating and formatting the IP packets in the one or more content streams into link layer packets as part of a baseband data packet stream based on a specific transport protocol. In some embodiments, broadcast gateway 110 encapsulates the one or more content streams by adding a data link layer based on the ATSC Link Layer Protocol (ALP) described in ATSC Standard A/330 that carries the IP packets provided by studio content processing system 105 over the ATSC 3.0 broadcast standard physical layer. The encapsulation may further provide the mapping of some, or all of the IP packets extracted from the content streams into sub-streams within the broadcast streams, often referred to as physical layer pipes (PLPs).

The processing in broadcast gateway 110 also includes packet management or scheduling in order to convert the broadcast signal transport stream into a stream containing baseband data packets suitable for processing by the exciter 115. The broadcast gateway 110 also generates a network configuration and control stream as well as a preamble stream as part of the scheduling operation. In some embodiments, the network configuration and control stream may be referred to as a timing and management control data stream. The broadcast signal transport stream, including the network configuration and control stream and preamble data stream, are used by exciter 115 to create the broadcast emission signal waveform. In some embodiments, one or more packets of the broadcast signal transport stream may be tunneled using a protocol such as the studio to link transport protocol (STLTP) as described in ATSC standard A/324 as part of an ATSC broadcast. Further, in some embodiments, the tunneled packets may include a security mechanism, such as a packet or stream signature, allowing exciter 115 to determine if the packet or stream has been tampered with. Information associated with packet or stream security associated with the present disclosure will be described in further detail below.

Exciter 115 receives the broadcast signal transport stream, along with the network configuration and control stream and preamble data stream, from the broadcast gateway and provides additional link layer signal processing to the streams to form the broadcast emission signal based on the network configuration and control stream and preamble data stream. The link layer signal processing may include one or more forms of data error correction encoding, temporal interleaving encoding, and data signal modulation. The data error correction encoding may include, but is not limited to, Reed-Solomon encoding, Viterbi encoding, Bahl, Cocke, Jelinek, and Raviv (BCJR) encoding, and low-density parity check (LDPC) encoding. The data signal modulation may include but is not limited to vestigial sideband (VSB) modulation, multi-level quadrature amplitude modulation (QAM), and multi-level orthogonal frequency modulation (OFDM). The resulting broadcast signal is converted from a digital format signal to an analog format baseband or low frequency signal and further upconverted to a frequency for transmission as analog transmission signal. In some embodiments the frequency for transmission may be in the very high frequency (VHF) range from 54 megahertz (MHz) to 88 MHz and 174 MHz to 216 MHz or in the ultra-high frequency (UHF) range from 470 MHz to 868 MHz. The exciter 115 may also apply analog signal transmission precorrection to account for known or anticipated signal distortion caused by signal amplification in transmitter 120.

It is important to note that the link layer signal processing, data signal modulation, and signal up-conversion used by exciter 115 may conform to one or more of several broadcast signal physical layer broadcast standards. Such broadcast standards include, but are not limited to, ATSC 3.0, the digital video broadcasting (DVB) standard DVB-T2, and the integrated services broadcasting (ISDB) standard ISDB-T.

Transmitter 120 receives the analog transmission signal from exciter 115 and amplifies the signal from its received signal level of around one milliwatt (mW) to a level between one kilowatt (KW) and ten KW. Transmitter 120 may perform the amplification in stages and may include signal filtering between the stages as well as at the output in order to remove signal distortion artifacts and other undesired signal energy outside of the desired frequency range for the transmitted signal. It is worth noting that the type and amount of amplification and filtering that is used in transmitter 120 may affect the type and necessity for analog signal transmission precorrection that may be applied by exciter 115. The amplified RF transmission signal is provided to transmitter antenna 125 for emission as an over the air broadcast signal. The transmitter antenna 125 may include one or more antenna elements that are arranged and/or configured to provide the necessary or desired radiated emission pattern in order to provide the proper geographic cover area for the RF transmission signal. As illustrated, transmitter antenna 125 is incorporated as part of a communication tower that may be 50 or more feet tall. In some embodiments, transmitter antenna 125 may be incorporated as part of other structures including, but not limited to, a residential or commercial dwelling, a utility pole, a bridge, and the like.

One or more of the content streams from studio content processing system 105 are also provided to transport multiplexer 130 as part of a legacy broadcast communication. Transport multiplexer 130 operates in a similar manner to broadcast gateway 110 but is intended to process different types of content streams. More specifically, transport multiplexer 130 is configured to process one or more elementary broadcast signal streams having uniform packets that can be rearranged into a single broadcast transport stream while broadcast gateway 110 is configured, as described above, to process one or more content streams into different types of streams that are based on packet protocols such as transport control protocol/internet protocol (TCP/IP) and formats these stream into a complex broadcast signal transport stream. As such, the processing in transport stream multiplexer 130 includes identifying and, formatting and combining the one or more elementary content streams into a broadcast transport stream. The processing may also include program identification (PID) remapping as well as service remapping and generation and insertion of service information tables directly into the broadcast transport stream. In some embodiments, transport multiplexer 130 processes content streams consistent with the ATSC A/53 and A/73 standards.

Exciter 135 receives the broadcast signal transport stream from the transport multiplexer 130 and provides additional link layer signal processing to the streams to form the broadcast emission signal. The link layer signal processing may include one or more forms of data error correction encoding, temporal interleaving encoding, and data signal modulation similar to that described above for exciter 115. The resulting broadcast signal is converted from a digital format signal to an analog format baseband or low frequency signal and further upconverted to a frequency for transmission as analog transmission signal in transmitter 140 in a manner similar to that described above.

It is important to note that the link layer signal processing, data signal modulation, and signal up-conversion used by exciter 135 may conform to one or more of several broadcast signal physical layer broadcast standards. Such broadcast standards include, but are not limited to, ATSC 1.0 and DVB-T.

Transmitter 140 receives the analog transmission signal from exciter 135 and amplifies the signal to a level between one kilowatt (KW) and ten kW as described above for transmitter 120. The amplified RF transmission signal is provided to transmitter antenna 145 for emission as an over the air broadcast signal. Transmitter antenna 145 may be configured and operates in a manner similar to that described for antenna 125 above. Further, in some embodiments, antenna 125 and antenna 145 may be incorporated as part of the same communication tower or other structure.

The broadcast signal transport stream, along with the network configuration and control stream and preamble data stream, from the broadcast gateway 110 is also provided through local network 150 to gateway 160. Local network 150 may be configured to deliver data as signals between various devices connected to local network 150 using an internet protocol (IP). The local network 150 may use various arrangements and other facilities or devices (not shown) to physically connect the devices together including, but not limited to, a microwave communications link, a high-speed fiber communications link, a lower speed copper wire communications link, and cellular or wi-fi communications link.

Gateway 160 processes the one or more baseband content streams and formats the streams into one or more broadcast signal transport streams for use by exciter 165. The processing in gateway 160 includes encapsulating and formatting the IP packets contained in the one or more content streams into link layer packets as part of the baseband streams used as part of the re-broadcast of the received signal based on a specific transport protocol as described above for broadcast gateway 110.

It is worth noting that the processing capability in gateway 160, which may be referred to as an edge gateway device, differs in several aspects to broadcast gateway 110. For example, it is not common or, in many cases, practical, to use broadcast gateway 110, and similar broadcast gateways, as an edge gateway device for internet type communication due to the fact that a broadcast transmission channel does not have available bandwidth for a return communication path across the broadcast network. Further, gateway 160, and similar edge gateways, typically provide routing functionality that require only support for validating a limited key signing security system while broadcast gateway 110, and similar broadcast gateways, are configured to support a private key signing security system, such as is used in many broadcast content transmission protocols, a function not typically employed as part of an edge gateway. Gateway 160, and similar edge gateways, also can be controlled using a management stream that is included as part of the data provided in the streaming content allowing unattended operation.

Exciter 165 receives the broadcast signal transport stream(s) containing the one or more content streams from the gateway 160 and provides additional link layer signal processing to the streams to form a broadcast emission signal and, finally, an analog transmission signal, for rebroadcast in a manner similar to that described above for exciter 115. The one or more baseband streams are similar to the content streams received from broadcast gateway 110, as described above, may include, among other elements, a network configuration and control stream and a preamble data stream. Transmitter 170 receives the analog transmission signal from exciter 165 and amplifies the signal in a manner similar to that described above for transmitter 120. The amplified RF transmission signal is provided to antenna 175 for emission over the air as described above for antenna 125. It is worth noting that the frequency that is used for the analog transmission signal in exciter 165 may be the same as, or different from, the frequency used for the analog transmission signal from exciter 115 depending on the signal transmission format and/or protocol used.

It is worth noting that the configuration in FIG. 1, that includes gateway 160, exciter 165, transmitter 170, and transmitter antenna 175, allows for a re-transmission of all or a portion of the broadcast signal transmitted by transmitter antenna 125 from transmitter 120. It is therefore expected that the geographic location of the transmission facility and the transmitter antenna 175 will be different from the geographic location of transmission facility and transmitter antenna 125.

EAS receiver 180 is configured to detect and receive emergency events that are broadcast as part of a separate network, such as the emergency broadcast network. If an emergency event is detected and received by EAS receiver 180, the information is provided to the studio content processing system 105. The studio content processing the system 105 processes the information and may insert the processed information into one or more of the content streams. In one embodiment, the processed information may be inserted into the secondary video and audio service portion of the broadcast signal transport stream.

Broadcast content diagnostic device 190 is capable of being coupled into an element in the broadcast content distribution system 100 and monitors the signals passing into and/or out of the component or element. The monitored signals are further processed to perform signaling identification and verification, services and system table analysis, multicast data packet analysis, RF and other physical layer signal data analysis, rules event analysis, and electronic service guide (ESG) analysis. Further, broadcast content diagnostic device 190 provides a user input interface for selecting and controlling the monitoring and analysis functions. The broadcast content diagnostic device 190 also includes the capability to record and store the monitored signals along with the analysis functions. The broadcast content diagnostic device further provides the signals and/or results for display or audio output through a GUI.

It is worth noting that while broadcast content diagnostic device 190 is shown in FIG. 1 as coupled to exciter 115, broadcast content diagnostic device 190 may be coupled and utilized at various points within the broadcast content distribution system 100 including, but not limited to, studio content processing system 105, transport multiplexer 130, gateway 160, and the like. Further Information regarding operation of a diagnostic device, such as broadcast content diagnostic device 190, will be described in detail below.

In operation, media content is provided from a number of content sources to studio content processing system 105. Studio content processing system processes the content streams to form one or more media streams. The media streams are further processed in various other components in broadcast content distribution system 100 for delivery to either users or viewers as a broadcast transmission signal, or network content service providers. The network content service providers may then deliver some or all of the media streams to users or viewers using an alternative content delivery method, such as a cable signal distribution network, IP streaming service, and the like.

The broadcast content diagnostic device 190 is used by an operator of the broadcast content distribution system 100 to monitor and/or analyze the operation of various aspects of the components described above along with any signals and data that are produced by, or communicated between, those components. The broadcast content device 190 accesses and/or receives one or more of the signals and/or any data produced by, or communicated between, the components. The signals and/or data may collectively be referred to as media streams as almost all communication generated and communication between devices is formatted in some form of a media stream. The media streams may include low level formatted signals, such as audio streams, video streams, PSIP streams, internet protocol streams, and the like. The media streams may also include higher level formatted signals, such as service streams, transport streams, and radio frequency broadcast streams, and the like.

As described above, the broadcast content diagnostic device 190 may be coupled to various components in the broadcast content distribution system 100. The broadcast diagnostic device 190 may also be coupled at various points along the signal communication link between the various components. The place or position where the broadcast diagnostic device 190 is coupled into broadcast content distribution system 100 may be referred to as a location. In some embodiments, one or more of the components in broadcast content distribution system 100 may be at the same physical or geographic location while other components may be at different physical or geographic locations. For clarity purposes, the term location, as used herein, refers to the components, or signal communication points, themselves rather than the actual physical or geographic locations for those components or signal communication points.

The broadcast content diagnostic device 190 selects one or more operational or performance characteristics associated with one or more signals or media streams in response to a first user input (e.g., through a user input interface). The broadcast content distribution device 190 further generates for display a first display component or element as part of a GUI. The first display component or element includes a visual representation of the one or more characteristics for a signal first media stream that has been received by broadcast content diagnostic device 190. The broadcast content diagnostic device 190 additionally generates for display a second display component or element as part of the GUI in response to a second user input. The second display element includes a visual representation of the one or more characteristics of another or second signal or media stream that is received by the broadcast content diagnostic device 190.

In some embodiments, the broadcast content diagnostic device 190 may identify a relationship between the two received signals media streams. The relationship may be established by an input from the operator or may be identified by the broadcast content diagnostic device 190. Several different types of relationships are possible. For example, the second signal or media stream may be a sub-signal or sub-stream of the first signal or media stream (e.g., a content stream within a service stream or PLP within a transport stream). Alternatively, the signal or media first stream and the signal or second stream may have the same formatting parameters (e.g., MPEG-2 video format streams) but have different media or data content. Further, the first signal or media stream may be monitored at a first location and the second signal or media stream may be the same as the first signal or media stream but monitored at a second location that is different from the first location. In such cases, the relationship may be used to configure the broadcast content diagnostic device to dynamically update the visual representation of the second display component or element in response to a change in the visual representation of the first display component or element. The operation of diagnostic devices similar to the broadcast content diagnostic device 190, as well as information regarding the identification and use of the relationships between streams or other aspects and elements of signal communication systems similar to broadcast content distribution system 100 will be described in further detail below.

Figure 2:
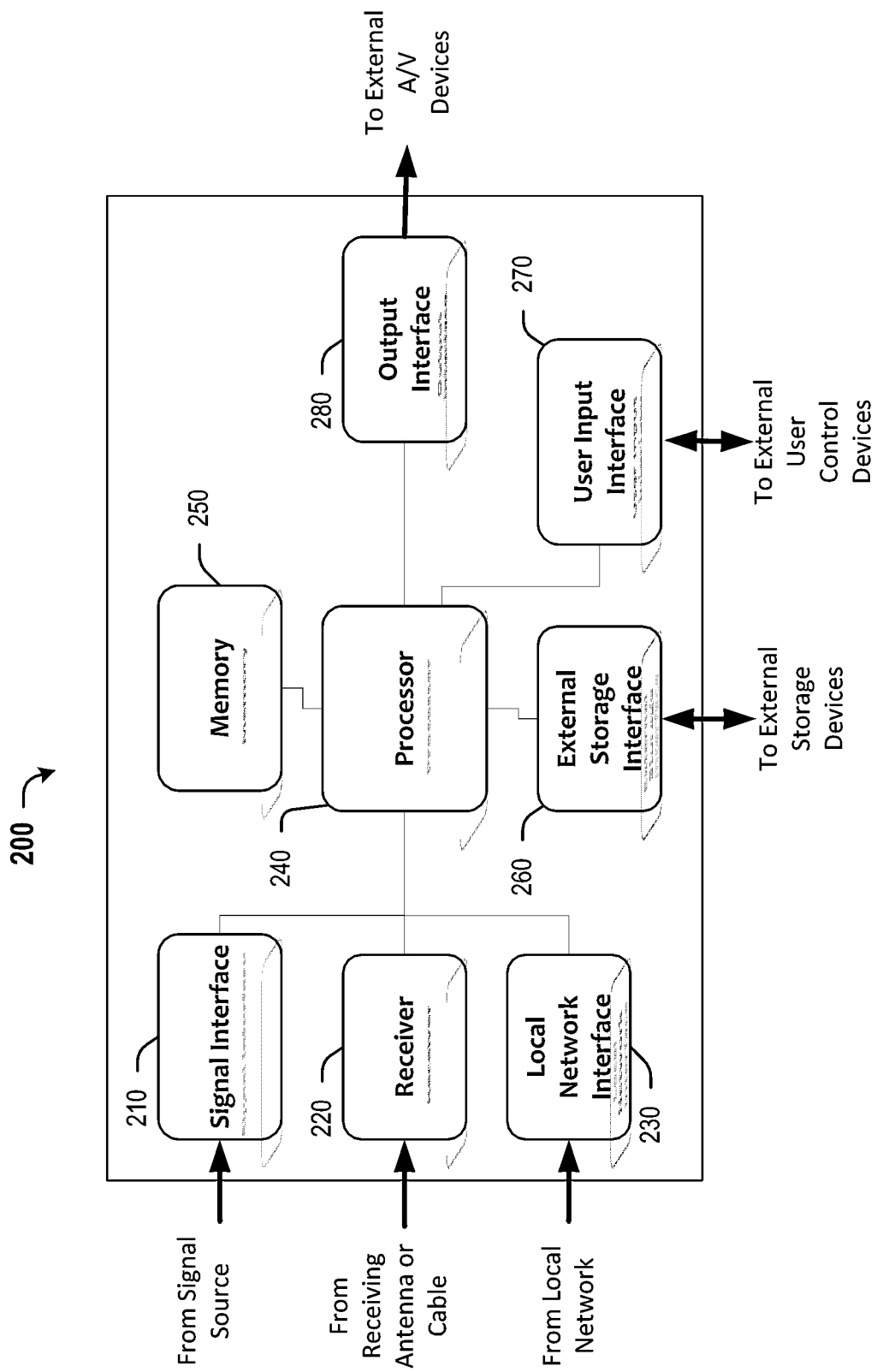
FIG. 2 is a block diagram of an exemplary diagnostic device used in a signal communication system, according to aspects of the present disclosure.

FIG. 2 illustrates a block diagram of an exemplary diagnostic device 200 according to aspects of the present disclosure. The diagnostic device 200 may operate in a manner similar to broadcast content diagnostic device 190 described in FIG. 1. The diagnostic device 200 may be used in conjunction with monitoring the operations and signals in a broadcast content distribution system 100. Diagnostic device 200 may also be used as part of monitoring operations and signals in other content or information delivery systems or networks. Signals from a signal source (e.g., studio content processing system 105 in FIG. 1) are provided to signal interface 210. Signal interface 210 is coupled to processor 240. A signal that is transmitted or broadcast from a signal transmission device (e.g., antennas 125, 145, and/or 175) is provided to receiver 220. Receiver 220 is coupled to processor 240. A signal that is communicated on a local network (e.g., local network 150) is provided to local network interface 230. Signal interface 210, receiver 220, and local network interface are each coupled to processor 240. Processor 240 is coupled to memory 250. Processor 240 is also coupled to external storage interface 260 which communicates with external storage devices. Processor 240 is additionally coupled to user interface 270 which communicates with, and receives inputs from, external user control devices. Processor 240 is further coupled to output interface 280 which provides audio and/or video signals to external audio/visual (A/V) devices. It is worth noting that some elements or components that may be necessary for proper operation of diagnostic device 200 are not shown or described here for the sake of conciseness as they are well known to those skilled in the art.

Signal interface 210 receives signals through a direct connection to a device used in a signal communication system (e.g., studio content processing system 105, exciter 115, etc. in FIG. 1). Signal interface 210 may provide some signal processing, such as signal reformatting and analog to digital conversion, in order to provide the signals to processor 240 for analysis. Signal interface 210 may include one or physical interface components, such as Radio Communication of America (RCA) standard phone jacks, or other devices and circuits, such as asynchronous serial interface (ASI) and the society of motion picture and television engineers (SMPTE) 310.

Receiver 220 receives a broadcast signal through an externally connected RF receiver antenna (not shown) or through a coaxial cable connected to a broadcast cable network or device (not shown). The broadcast signal will have signal energy within a specific region or band of frequencies, typically between six and ten megahertz (MHz) in bandwidth, within the VHF and UHF range. The receiver 220 may include one or more suitable RF connectors, such as F-type connectors, mounted on the diagnostic device 200 for connecting to the RE receiver antenna and/or coaxial cable. The receiver 220 tunes and demodulates the broadcast signal to generate a signal that can be processed for analysis in processor 240. The tuner/demodulator 210 can be controlled to perform its processing based on a specific broadcast signal transmission protocol (e.g., ATSC 3.0, ATSC 1.0) using control signals from processor 240 based on selections and/or user inputs made through user interface 270. The components or elements used in receiver 220 may include, but are not limited to, filters, amplifiers, frequency downconverters, analog to digital signal converters, multi-phase multi-amplitude demodulators, error correction decoders, and the like. The components or elements may be combined or integrated into one or more larger components, such as integrated circuits or multi-chip modules. In some cases, one or more of the elements may be implemented as part of firmware or software in a digital signal processor.

Local network interface 230 provides a communication interface to a local network (e.g., local network 150 in FIG. 1) that is used in operation of a communication network (e.g., broadcast content distribution network 100). Local network interface 230 includes circuitry to perform signal processing functions for receiving signals that are present and being communicated between devices connected on the local network (e.g., broadcast gateway 110 and gateway 160). The received signals are decoded and provided to processor 240 as part of the monitoring and analysis operations. The signal processing functions in local network interface 230 may include protocol configuration used for operation on local networks, such as Ethernet or wireless networks. Local network interface 230 may also transmit data, such as protocol acknowledgments or access requests generated by processor 240 to the local network for delivery to one or more of the connected devices. Local network interface 230 also includes an interface connector suitable for the type of communication medium used with the local network. The interface connector may include, but is not limited to, an F-type coaxial connector, a straight tip (ST) type optical connector, a registered jack (RJ) type RJ-11 or RJ-45 connector, a mechanical transfer registered jack (MT-RJ) type connector, and the like. Local network interface 230 may also include one or more antennas that may be configured for use with wireless operation as part of the local network.

Processor 240 receives the one or more signals containing data and information from the signal interface 210, receiver 220, and/or local network interface 230. Processor 240 may further process the signal(s) to separate out groups of data packets from any sub-streams present in the signal(s). Processor 240 may separate packets that are intended for analysis and/or display based on, for instance, the selections made by a user or operator through user interface 270. Processor 240, may perform analysis on the one or more signals, such as averaging or correlation of various data and information in the signal(s). Processor 240 may also reformat any of the data, either received or generated, as needed for further processing in other components, such as output interface 280. For example, the data received may be in the form of a content stream for broadcast transmission and processor 240 may reformat the content stream for delivery to output interface as a high definition multimedia interface (HDMI) signal.

Processor 230 further receives status information as well as information about any received signals from sign interface 210, receiver 220, and/or local network interface 230, processes the information, and provides any control command information back to those elements. Processor 230 may also receive control instructions for specific operations for monitoring and analysis to be performed by diagnostic device 200 from external devices (e.g., through local network interface 230) in the broadcast signal distribution system (e.g., another diagnostic device). Processor 230 processes the control instructions and provides the necessary control information to the various elements in diagnostic device 200 to perform the specific operations.

It is worth noting that processor 240 may be embodied using a programmable microprocessor that is reconfigurable with downloadable instructions or software code stored in memory 250. Processor 240 may alternatively be a specifically programmed processing circuit configured as a signal and data processor as well as a controller with internal control code for controlling, managing, and processing all functions and data in diagnostic device 200. Further, one or more of the elements described in transceiver 200 may be combined into a larger component and may be implemented as a programmable microprocessor or as a specifically programmed processing circuit.

Memory 250 supports the operation of processor 240, as well as the other elements of diagnostic device 200, by storing and retrieving programming instructions and data associated with the control and operation of the diagnostic device 200. Memory 250 may also store and retrieve one or signals received through signal interface 210, receiver 220, and/or local network interface 230, during processing and analysis in processor 240. Memory 250 may include one or more of the following storage elements including, but not limited to, RAM, ROM, Electrically Erasable Programmable ROM (EEPROM), and flash memory. Memory 250 may also encompass one or more integrated memory elements including, but not limited to, magnetic media hard disk drives and optical media disk drives, which are housed with diagnostic device 200.

External storage interface 260 provides an interface to connect external storage devices (not shown) to diagnostic device 200 for additional storage capability. The external storage interface 260 may process the data signals in order to facilitate data transfer between the external storage devices and processor 240. The additional storage may be necessary, for instance, for capturing and storing, or recording, large portions of one or more signals or elements present in the signal communication system (e.g., broadcast content distribution system 100 in FIG. 1) for present or later review and further analysis. The external storage devices may include, but are not limited to, electronic flash storage drives, magnetic media hard disk drives, and optical media disk drives. External storage interface 260 may include the physical connectors as well as circuitry for using one or more of the various signal protocols associated with storage devices including, but not limited to, universal serial bus (USB) and personal computer memory card international association (PCMCIA).

User interface 270 provides a mechanism for receiving inputs from a user in order to facilitate control and operation of diagnostic device 200. User interface 270 may include a user input or entry mechanism, such as a set of buttons, a keyboard, or a microphone. User interface 270 may also include circuitry for converting user input signals into a data communication format to provide to processor 240. User interface 270 may further include some form of user notification mechanism to show device functionality or status, such as indicator lights, or small display. User interface 270 may also include circuitry for converting data received from processor 240 into signals that may be used to operate the user notification mechanism.

Output interface 280 allows connection to one or more audio and/or video reproduction devices (not shown), such as a display device, display monitor, television, audio speakers and the like. Output interface receives an audio and/or video signal that has been generated in processor 240 and processes the signal(s) for delivery to the reproduction device. Output interface 280 may include additional signal processing circuitry including, but not limited to, digital to analog converters, signal filters, digital and/or analog signal format converters, modulators, and the like. Output interface also includes one or more physical connectors to connect to the audio/video reproduction device using one or more of several different types of audio/video connecting cables. The one or more physical connectors may include, but are not limited to, RCA or phone type connectors, HDMI connectors, digital visual interface (DVI) connectors, Sony/Philips digital interface (S/PDIF) connectors, Toshiba Link (Toslink) connectors, and F-type coaxial connectors.

Diagnostic device 200 performs three main functions as a part of a signal communication system, inputting of media streams, monitoring and analysis of those media streams, and providing results of the monitoring analysis to audio/visual devices for use by an operator. Diagnostic device 200 includes the capability to receive signals and media streams in multiple formats, including elementary streams and service streams (e.g., Route/MMTP, MPEG-2, Ethernet, and the like), transport layer streams (e.g., broadcast transport, STLTP, ALP, and the like), and RF or physical layer streams or signals (e.g., ATSC 1.0 broadcast, ATSC 3.0 broadcast, and the like), as well as IP signals created at any of these layers. Diagnostic device 200 can monitor any one of these media streams from any of these layers that are received at one of the inputs (e.g., signal interface 210, receiver 220, and local network interface 230. The diagnostic device 200 can further perform analysis on many of the media streams as well as validate many of the data structures and formatting based on various signal standards (e.g., ATSC 1.0, ATSC 3.0, and the like). The diagnostic device 200 can further analyze and validate various data tables, schedules, and program data, found in the media streams including, but not limited to, service map table (SMT), service list table (SLT), service layer signaling (SLS), extended file delivery table (EFDT), electronic service guide (ESG), and the like. The diagnostic device can additionally map and analyze information and data contained in the media streams that is configured using multicast IP.

The diagnostic device 200 further includes the capability to produce analysis outputs that may be used by an operator to alter operational parameters in the signal communication system using rules or rule sets. The rules or rule sets may be input by the operator (e.g., through user input interface) or may be pre-loaded into diagnostic device 200. The diagnostic device 200 also includes the capability to record and manage some or all of the media streams (e.g., using an external storage device connected to external storage interface 260) using a stream capture tool such as packet capture (PCAP).

The diagnostic device 200 additionally includes the capability to provide real-time video and audio streams representing signals at any of the layers (e.g., elementary stream or service, transport, and physical layers) including displaying the video portion of a media stream as a series of thumbnails. The diagnostic device 200 can also generate and provide for display the status (such as frequency of occurrence, object buffering of any indicators, tables, or maps for the signals as either a data table or in some type of graphical representation.

The diagnostic device 200 further includes user friendly features including color mapping as part of displaying multiple signals or media streams simultaneously, the capability to import and export configuration files to other diagnostic devices, and user management control tools that facilitate remote access to the information and data that has been input to, or stored in, diagnostic device 200.

In operation, one or more signals containing one or more media streams is accessed or received at signal interface 210, receiver 220 or local network interface 230. The signal may be accessed or received at any one of the locations in the signal communication system (e.g., at a component or at a signal communication link coupling the components). The media stream may be a lower level type signal (e.g., an audio stream, a video stream, PSIP stream, an IP stream, and the like) or may be a higher level more complex type signal (e.g., a radio frequency broadcast stream, a transport stream, a service stream, and the like). In one embodiment, the signal communication system is a broadcast communication system, such as broadcast content distribution system 100 in FIG. 1 and the received media streams are DSTP streams that comply with the ATSC 3.0 standard. The signal is provided to the processor 240 in order to process the signal for analysis and display.

The processor 240, as part of processing the received signal, identifies and/or selects one or more characteristics associated with the one or more media streams in the received signal that is being monitored at a first location. The selection is made by the processor 240 in response to an input from an operator made through user input interface 270. The processor 240 also generates for display through output interface 280 a first display element in a GUI. The first display element includes a visual representation of the one or more characteristics that are being monitored at the first location for a first media stream that is received as part of the signal. The processor 240 further generates for display through output interface 280 a second display element in the GUI in response to a second user input. The second display element includes a visual representation of the one or more characteristics for a second media stream that is related to the first received media stream. The processor 240 additionally updates the visual representation of the second display element when there is a change in the visual representation of the first element, providing all updates for display through output interface 280.

In some embodiments, the second media stream may be a media sub-stream of the first media stream. In these embodiments, the processor 240 may further generate for display through output interface 280 a third display element in the GUI in response to a third user input. The third display element includes a visual representation of the same one or more characteristics of a third media stream that is related to the second media stream, or media sub-stream of the first media stream and also updates the third display element in response to any change in the second display element.

In some other embodiments, the second media stream may have the same signal format and/or signal parameters as the first media stream but contain media content and/or data that is not the same. For example, the first media stream and second media stream may be AVC streams, but the first media stream may be from a first ATSC 3.0 broadcast program and the second media stream may be from a second ATSC 3.0 broadcast program.

In some embodiments, the second media stream may have its one or more characteristics monitored at a second location that is different from the first location used for monitoring the one or more characteristics of the first media stream. It is worth noting that several mechanisms exist for monitoring characteristics for media streams at more than one location. For instance, a signal containing the first media stream may be received from a signal source at a first location (e.g., studio content processing system 105 in FIG.

1) and another signal containing the second media stream may be received from a transmission source (e.g., transmitter antenna 125) at a second location. Although these signals originate from two different physical or geographic locations, the signals may be monitored by the diagnostic device 200 through one or more of the signal communication links (e.g., wired, or wireless) in the signal communication system (e.g., broadcast content distribution system 100 in FIG. 1). As described earlier, the location that the monitoring is performed is not restricted to a physical or geographic location but instead refers to a location of a component or communication link within the signal communication system.

In some embodiments, the processor 240 may compare the information processed, analyzed, and displayed as part of the first display element to the information processed, analyzed, and displayed in the second display element. In response to the comparison, the processor may further provide an indication to the operator and/or a notification to other components in the signal communication system through, for instance, local network interface 230. For example, a notification may be provided to the operator through the GUI.

Figure 3:
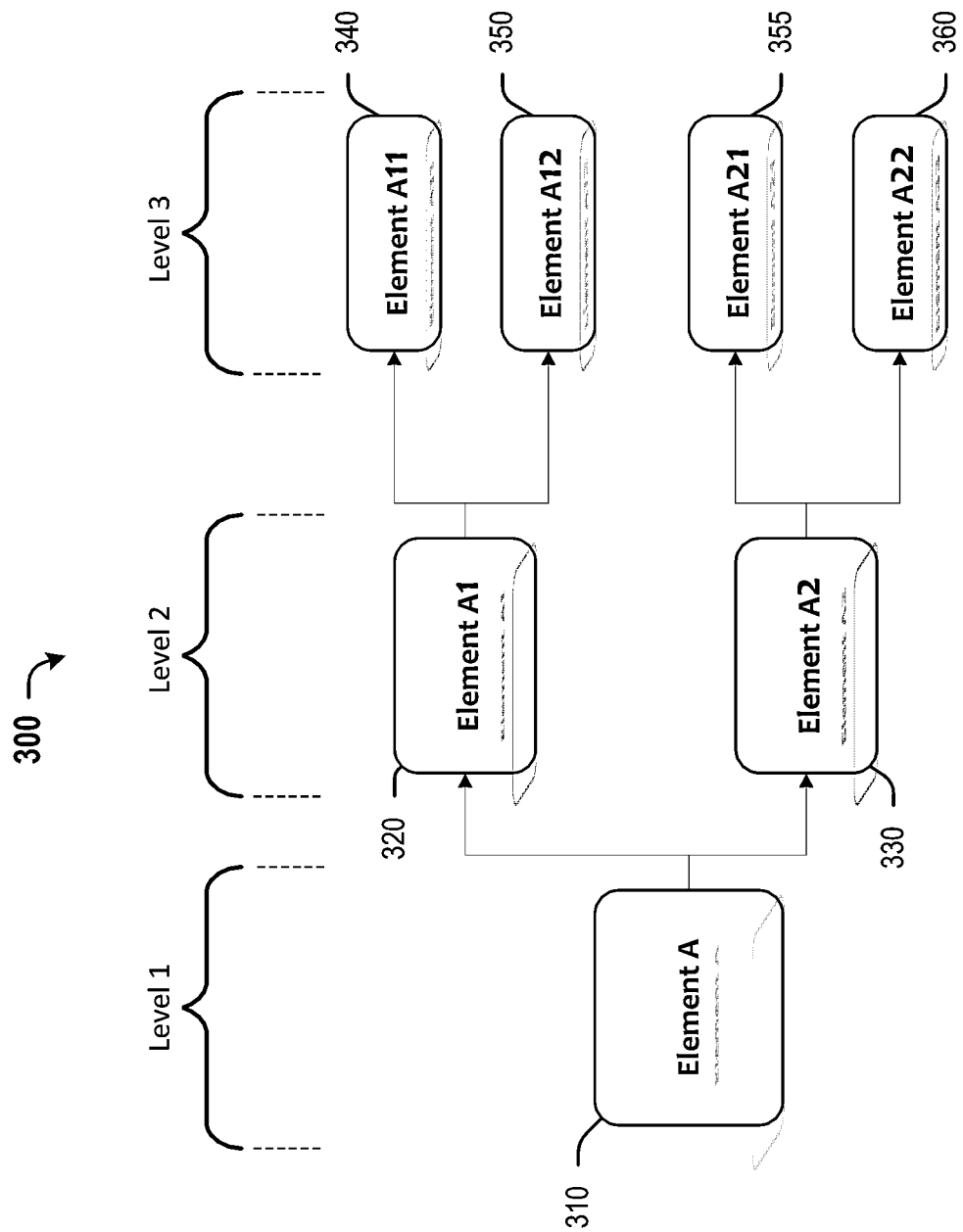
FIG. 3 is a diagram of an exemplary tree node hierarchy used for monitoring and analysis of media content, according to aspects of the present disclosure.

FIG. 3 illustrates a diagram of an exemplary tree node hierarchy 300 used for monitoring and analysis of media content according to aspects of the present disclosure. The tree node hierarchy 300 may be utilized to monitor and analyze the various communication and data signals as part of operation of a diagnostic device, such as diagnostic device 200 in FIG. 2. The tree node hierarchy 300 may also be utilized as part of monitoring and analysis operations in a diagnostic device, such as broadcast content diagnostic device 190 in FIG. 1, in a broadcast content distribution system, such as broadcast content distribution system 100. Tree node hierarchy 300 may be applied to represent condition information of various components or elements, as well as sub-components or sub-elements, of a system (e.g., broadcast content distribution system 100). At level 1, element A 310 is shown coupled to element A1 320 as well as element A2 330, at level 2. Element A1 is shown coupled to element A11 340 and element A12 350, at level 3. Additionally, element A2 is shown coupled to element A21 360 and element A22 370, also at level 3. Although only three levels are shown, additional levels may be present to expand the tree node hierarchy to lower (further right) levels. Further, although the three levels are shown with one, two and four elements respectively, more, or fewer elements may be present at each level.

It is worth noting that not all elements at a particular level may be coupled to an element at a higher (i.e., further left) level. It is further worth noting that an element at a particular level that is coupled to an element at a higher level may be referred to as a sub-element of that element at the higher level. In this manner, the main element(s) of the system to be monitored and/or analyzed and any subsequent lower level sub-elements of the main element(s) of the system are represented as connected nodes, or branches, branching off in a tree-like fashion to form the tree node hierarchy. Any elements that do not branch further to other elements may be referred to as leaves. The use of a tree node hierarchy, such as tree node hierarchy 300, allows for an efficient mechanism to maintain interrelationships between the various elements and sub-elements that may exist and be monitored and/or analyzed within a system (e.g., broadcast content distribution system 100 in FIG. 1).

The functional arrangement described in tree node hierarchy 300 is used as a linking mechanism in processor 260 in diagnostic device 200 to establish the relationships between media streams. Each one the elements in the tree node hierarchy represent an item that can be monitored in the signal communication system environment. Each element has a uniform resource locator (URL), referred to as a location, which is hierarchically represented, starting with a top layer (layer 1) and continuing to the lowest identified layer at or below the top layer. Each element may contain one or more identifying and monitorable parameters including, but not limited to element identifier (ID), element name, quality of service (QOS), bitrate, parent element, and child element, depending on element type. An exemplary set of hierarchy layers for elements used by diagnostic device 200 is shown here:

Layer 1—Source: A source layer element is typically a computer or physical device that is represented by an IP address.

Layer 2—Physical: A physical layer element contains the direct signal that may be available at an interface port on the source.

Layer 3—Transport: A transport layer element contains the data signal that is received via tuning the signal that may be available at the interface port.

Layer 4—Service: A service layer element contains a logical collection of streams which comprise a representation of a "channel" following data signal decomposition at the transport layer.

Layer 5—Stream: A stream contains elementary data such as video, audio, captions, data, metadata, etc. following stream separation at the service layer.

It is worth noting that a tree node hierarchy similar to that described in FIG. 3 may be applied to one or more aspects of a GUI used in conjunction with the operation of a diagnostic device (e.g., diagnostic device 300 in FIG. 3). In some embodiments, visual or display components or elements in the GUI may be linked together in order to display signals or media streams that are related to each other in some manner. The linking allows changes made to the configuration of one visual component to automatically be made to other visual components. Information regarding the use of a tree node hierarchy in a GUI will be described in further detail below.

FIGS. 4 through 8 illustrate a set of screenshots associated with a GUI according to various aspects of the present disclosure. The GUI may be used as part of the operation of a diagnostic device, such as diagnostic device 200 described in FIG. 2. The GUI may equally be used as part of the operation of a diagnostic device that is used in conjunction with monitoring and/or analyzing signals in a signal communication system, such as broadcast diagnostic device 190 in broadcast content distribution system 100 described in FIG. 1. An operator may use the GUI to control both the arrangement of the signals and characteristics as well as, in many cases, control settings associated with the signals and characteristics. The GUI may be displayed directly on or as part of the diagnostic device or may be displayed in conjunction with an external display device coupled to the diagnostic device.

The GUI described in FIGS. 4 through 8 is composed of two primary components, containers, and display components. All components may share common properties, such as dimensions, coloring, and location information. Containers, also referred to as layout elements, provided the structure for the GUI. Display components, also referred to as user interface (UI) elements, provide a visual representation of data or information associated with characteristics for one or more of the elements, such as media streams, monitored and/or analyzed using the diagnostic device in a signal communication system (e.g., broadcast content distribution system 100 in FIG. 1). The GUI includes a first level container, referred to as a dashboard. An operator may configure the dashboard using containers and/or display components for viewing the data or information. A dashboard may include one or more second level containers, referred to as panels. Each panel may include a display component and/or may further include additional containers. In some embodiments, the dashboard may be configured as a tree node hierarchy (e.g., tree node hierarchy 300 in FIG. 3) where containers are branches, as parents or children, and visual components are only children. Containers and display components, as children, may be added to containers, as parents, but not to other display components. Further, the sizes and locations of the added containers and/or display components may be adjusted to the parent container's properties.

The operator may enter the GUI as part of the initial operation of the diagnostic device or as a later operation, such as through the source management view of the GUI. Once in the initial or source management view, the operator may add, edit, or delete dashboards. Add & delete buttons are available at the top of the dashboard. To edit a dashboard, a user only needs to select a dashboard tab that may be located below a top row of buttons in the GUI. All created dashboards may have an auto generated name and an auto generated base URL. Any panels or other components in a dashboard may show up in a pulldown menu for that dashboard. Any panel or container in the dashboard editor view includes a mechanism to adjust its location in the dashboard. A "Visible in Menu" checkbox may also be included to allow this panel to appear in the dashboard panel pulldown. A user may create a panel or component in the dashboard by clicking on an "Add" button. Editing and deleting panel buttons may also be found on each panel editor.

Figure 4:
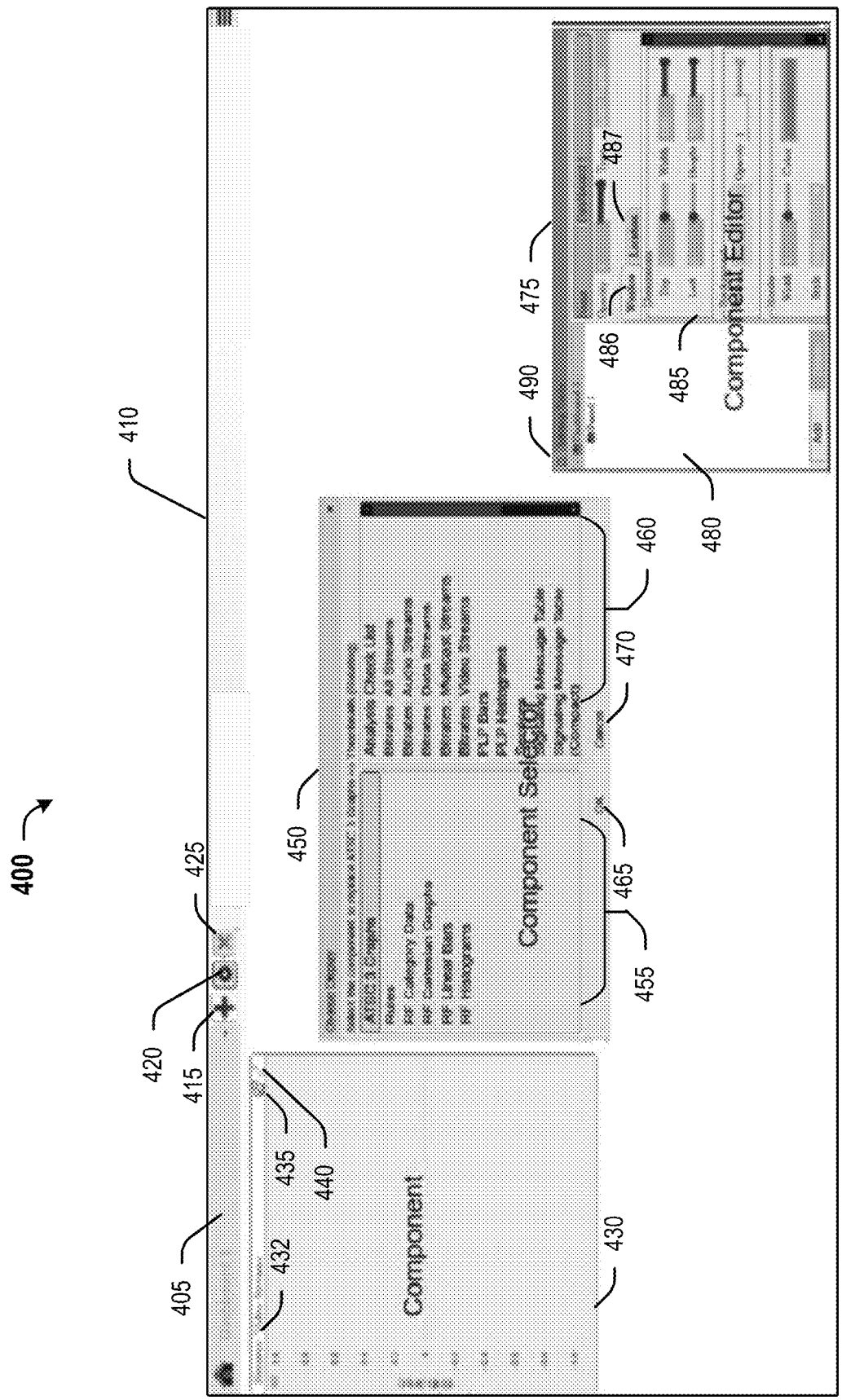
FIG. 4 is an exemplary screenshot of a graphic user interface (GUI) associated with the operation of a diagnostic device, according to aspects of the present disclosure.

FIG. 4 shows an exemplary screenshot 400 of a GUI associated with the operation of a diagnostic device, such as diagnostic device 200, according to aspects of the present disclosure. Screenshot 400 illustrates a dashboard 410. Dashboard 410 includes an identification window 405 that includes the name for the dashboard. An add icon 415, shown as a "plus sign", may be used to add a component (either a container or display component) to dashboard 410. Similarly, a delete icon 425, shown as an "X", may be used to delete a component from dashboard 410. The edit icon 420, shown as a "gear", may be used to make changes to components that are added to dashboard 410. As shown in screenshot 400, containers 430, 450, and 475 have been previously added to dashboard 410.

Container 430 includes a display component 432 representing the bit rate of a video stream. The dashboard 410 includes two viewing modes, a normal mode, and an edit mode. In normal mode, dashboard 410 will not display containers 450 and 475. Further, the edit icon 440, shown as a wrench at the top right of container 430, along with add icon 415 and delete icon 425, may be shaded to indicate unavailability in this mode. Only the container 430, including display component 432 and the select icon 435, along with edit icon 420, will be visible, indicating availability. In normal mode, data from a selected element may be displayed in container 430 as part of display component 432.

Edit mode for 410 may be entered by selecting the edit icon 420. In edit mode, the add icon 415 and delete icon 425, along with the edit icon 440 in container 430, will no longer be shaded, indicating availability. An operator may edit or configure dashboard 410, including any panels or containers in dashboard 410. Container 475 may be displayed when entering edit mode or by selecting the edit icon 440 in visual component 430. Container 475 is configured to allow editing of visual or display attributes of one or more components (e.g., containers or display components) in a container. Component editor 475 includes the hierarchical relationship 480 between the components in dashboard 410, shown in the left portion. As shown, the entry "Dashboard 1" is highlighted or selected indicating attributes of dashboard 410 can be edited. Component editor 475 also includes an edit panel 485, shown in the right portion. The edit panel 485 includes a selection for opacity along with two tabs, a window tab 486 and a location tab 487. As shown, the window tab 486 is selected and editable entries are shown for naming, opacity, dimensions, position, background colors, and border of visual component 430. Entries for location tab 487 are not shown. As mentioned above, location does not refer to a physical layout for a component but instead refers to target data to populate the component. As such, the location tab 486 may include a series of selectable location entries based on currently monitored or available elements through the diagnostic device (e.g., diagnostic device 200 in FIG. 2). The editing of locations with respect to components will be described in further detail below.

It is worth noting that a similar edit panel 485 may be present when the entry "Panel 1" is selected indicating attributes of container 430 may be edited. A select icon 490 may be used to end the editing in container 475 after changes are completed by the operator. The select icon 490 may cause container 475 to disappear from the display.

Container 450 may be displayed by selecting the select icon 435. Container 450 is configured as the display component selector for the display component 432. Container 450 may be selected for display in either normal mode or edit mode, allowing changes to the display component 432, and the data or information displayed, to be made at any time. Container 450 includes a series of selectable display type entries for displaying characteristics of signals or media streams in various formats in display component 432. The series of selectable entries are in hierarchical form with a set of entries for display type categories 455 in the left portion and a specific set of display type entries 460 for a selected one of the categories 455 in the right portion of component selector 450. The display type categories 455 along with display type entries 460 represent characteristics of the data or information from the one or more elements displayed in display component 432. Information regarding display type entries will be described in further detail below. An OK icon 465 may be used to accept the selected one of the entries 460. A cancel icon 470 may be used to cancel the operation. Selecting either OK icon 465 or cancel icon 470 may cause container 450 to disappear from dashboard 410.

In some embodiments, one or more of the display type entries may include additional selections or entries for custom settings that are unique to that display type entry. For example, a bitrate display type entry (e.g., "Bitrates: All Streams" in display type entries 460) may include an entry that allows the user to define and show upper boundary line as limit value or show a legend as part of the display component. These custom settings may be displayed and/or available for selection and editing as a separate tab in container 450.

As shown in FIG. 4, display component 432 displays a characteristic of the data representing "Bitrates: Video Streams entry from the display type entries 460 under the "ATSC 3 Graphs" from the display type categories 455.

Other display type categories may be available including, but not limited to Data, Bitrate, quality of service charts, streaming, and RF. In some embodiments, one or more of the display type entries in these categories may be displayed using different types of representations. These different types of representations include, but are not limited to, bar chart, block chart, doughnut chart, gauge chart, history multi data chart, history single data chart, pie chart, polar area chart, and table. In some embodiments, one or more of the display type entries in one of these categories may be specific to the category. For example, the display type entries for the RF category may include displaying the data represented as a constellation, an impulse response, a modulation error ratio, an RF level, a signal to noise ratio, a spectral, a transfer function, or any other RF related representation.

The list of display type categories 455 may also include a category labeled "Rules". The rules category allows an operator to configure a display component (e.g., display component 432 as a customized representation of one or more elements. The rules category may open a separate selection or entry component that allows the operator to apply operations to the display type entries for the one or more elements. For example, the display component 432 can be configured, using the rules category, to compare the bitrate for a data stream from a first element and the bitrate for the same data stream from a second element and display the result of the comparison as a bar graph.

In some embodiments, container 450 and/or container 475 may include additional selections or entries for user entered information as part of creating and configuring the components. The user entered information may be displayed as part of the display of the container or as part of the display of the display component in the container. Examples of user entered information includes, but is not limited to, text entry, video or audio content, hyperlinks to URLs, and hypertext markup language (HTML) Text used to create further customization of the component.

As shown in FIG. 4, containers 430, 450, and 475 are examples of a container type referred to as a fixed layout container. In some embodiments, one or more other types of containers may be used. The types of containers include, but are not limited to, border container, grid container, pulldown selection container, scrolling container, and template container. Each of these types of containers may be configurable in a manner similar to the fixed layout container based on predefined parameters for each type of container.

Figure 5:
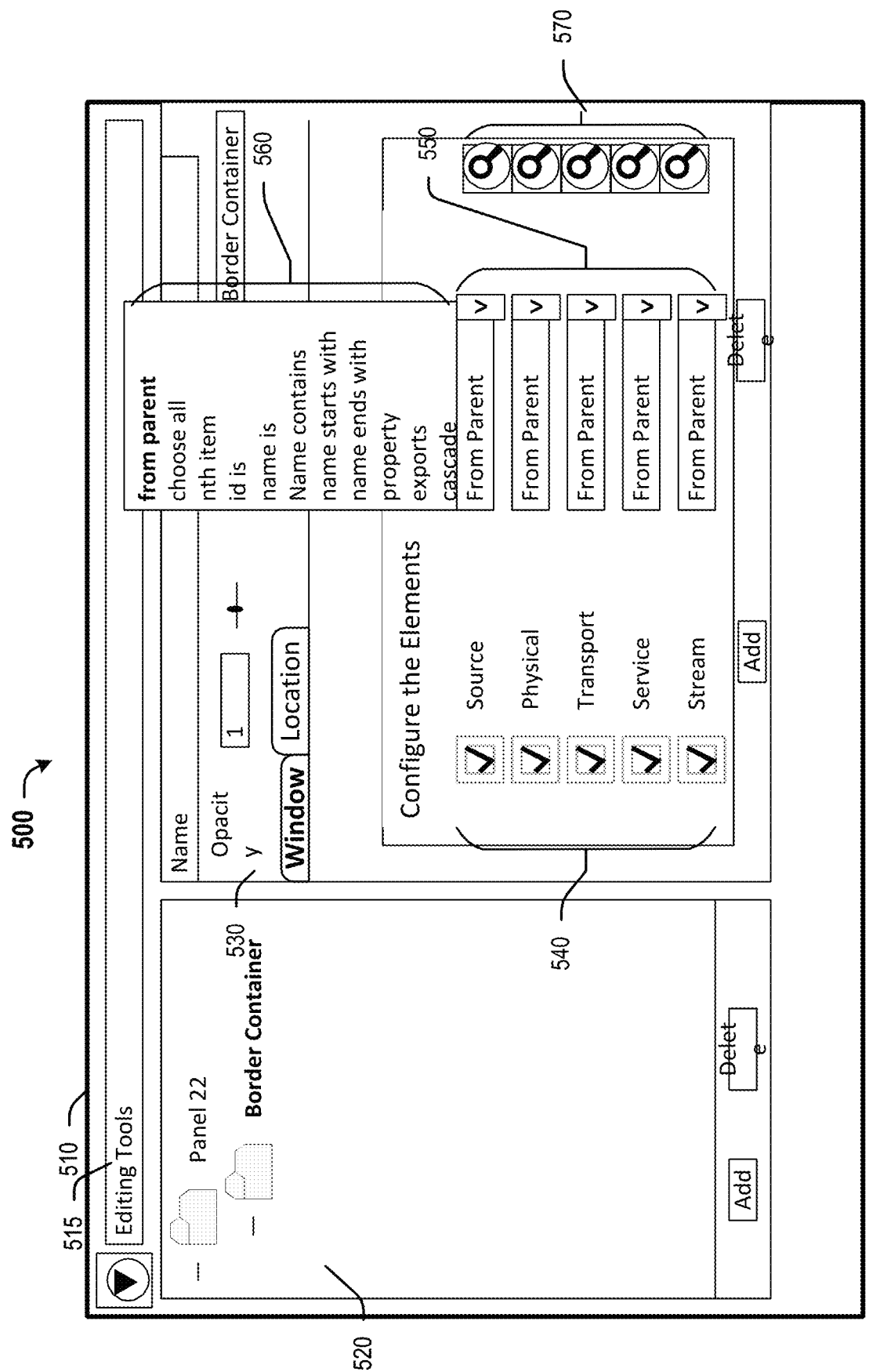
FIG. 5 is another exemplary screenshot of a GUI associated with the operation of a diagnostic device, according to aspects of the present disclosure.

FIG. 5 shows another exemplary screenshot 500 of a GUI associated with the operation of a diagnostic device, such as diagnostic device 200, according to aspects of the present disclosure. Screenshot 500 illustrates a container 510. Container 510 includes an identification window 515 that includes the name for the dashboard. Container 510 has been configured as a component editor similar to container 475 in FIG. 4. As with container 475, container 510 includes a hierarchical relationship 520 between the components (i.e., display components and containers) in the GUI shown in the left portion. The entry labeled "Border Container" has been highlighted as selected. Container 510 also includes an edit panel 530 in the right portion. As described above, the window tab in edit panel 530 includes selections (not shown) for configuring various visual attributes, such as colors & layout, for the selected container in the left portion.

The location tab, which is shown as highlighted and enlarged to indicate being selected in the edit panel 530, includes configuration information for the element types in the signal communication system arranged in hierarchical order. The entries under the location tab allow the operator to define and/or configure which search criteria should be applied as part of selecting the elements from which to receive data for display as part of one or more display components in the selected container. The set of element types 540 are shown in rows, each with a selection box. The configuration of the check marks in the selection boxes next to the set of element types 540 activates the search criteria. The bottom most selection box that includes a check mark for the set of element types 540 identifies the type of element from which data can be retrieved by the GUI from signal communication system (e.g., broadcast content distribution system 100 in FIG. 1) The identified type of element may be referred to as the target of the location search. As shown, the elements "Source", "Physical", "Transport", "Service", and "Stream", are all shown with a check mark in the selection box indicating the target for the location search for the selected container is stream elements. As another example, if the "Stream" and "Service" selection boxes did not include check marks (i.e., were unselected), then the target for the location search would be transport elements.

A set of search criteria entry boxes 550 are shown next to the set of element types 540 arranged in the corresponding rows. An arrow at the right of each of the criteria entry boxes is used to open a menu showing a search criteria selection list 560. The search criteria selection list 560 shows the available search criteria options for locating the elements associated with the corresponding element type from the set of element types 540. As shown, the search criteria list 560 for the element type "Source" is opened. The entry labeled "from parent" is highlighted as selected. Selecting this entry causes search criteria to be retrieved from a parent component (e.g., container labeled "Panel 22"). This entry may be used to hierarchically link components (e.g., containers and/or display components) together within the GUI.

As shown, all elements in the set of elements 540 show "from parent". As such, the search criteria for all elements will be retrieved from the parent component. If the parent component is also a child container and uses "from parent" for its search criteria, the retrieval propagates further up the tree (e.g., to the parent container for "Panel 22") until it finds a search criterion for that element type selection. As another example, if "choose all" is selected from the search criteria list 560 for the element type "Source", data, and information from all elements of type source in the signal communication system will be retrieved.

Other criteria are shown in search criteria list 560 including "nth item", "id is", "name is", "name contains", "name starts with", "name ends with" and "property". Selecting one of these search criteria may open another entry box for entering the specific conditions for the search. The specific conditions may include text as well as wildcard or conditional logic characters to characterize the search conditions. For example, if "name starts with" is selected and the name "Princeton" is entered for the condition, data, and information from any elements of the selected element type choose whose name starts with "Princeton" will be retrieved. Each of these search criteria retrieves data or information from elements that meet the criteria for the search based on the specific conditions. The entry in the search criteria list 560 labeled "export" retrieves data or information from elements that export a specific export type. Due to the special nature of this criteria, components which require an export will automatically fill out this field for the element type when needed. The entry in the search criteria list labeled "cascade" retrieves data or information from elements that are imported to a specified page via a URL, such as elementlds=xxx.xxx. In most instances, cascades may be set up via hyperlink components. Magnifying Lenses 570 are a utility to help select the location. Selecting the magnifying lenses 570 by clicking on the magnifying lens icon brings up a dialog box which lists all available locations (based on parent(s) information).

As shown, container 510 is configured as a component editor for a container (not shown) that is a border container type. The border container type, along with most other container types, act as placeholders for their display component children. These containers are static in the sense that the child components for those containers are defined during configuration in a component editor such as container 510. The template container type is different in that this type may include specific search criteria for data associated with elements. This type can also create a copy of each of its child components (containers & visual components) for each different element found based on its search criteria. This type can further use the resolved target for the location search information as the configuration for the created copies using the original child component's "from parent" search criteria entry. For example, a single child container, along with a display component template container is created below a parent template container. The parent template container is configured to use "Services" as the target for the location search with a search criterion of "choose all". The child container and display component are configured to use the target of the location search of "from parent" for the search criteria. The location search determines multiple services in the signal communication system. The single child container and display component will be copied for each one of the multiple services found. As a result, each one the child containers and display component will process a different service for display.

It is worth noting that the determination of locations using the search criteria described in FIG. 5 may be done any time an element in the signal communication system (e.g., broadcast content distribution system 100 in FIG. 1) is added or removed. When elements change in the signal communication system, through the add/remove functions in the GUI as described above, or as part of a physical reconfiguration of the signal communication system, the location determination may be recalculated for one or more of the components in the GUI.

Figure 6:
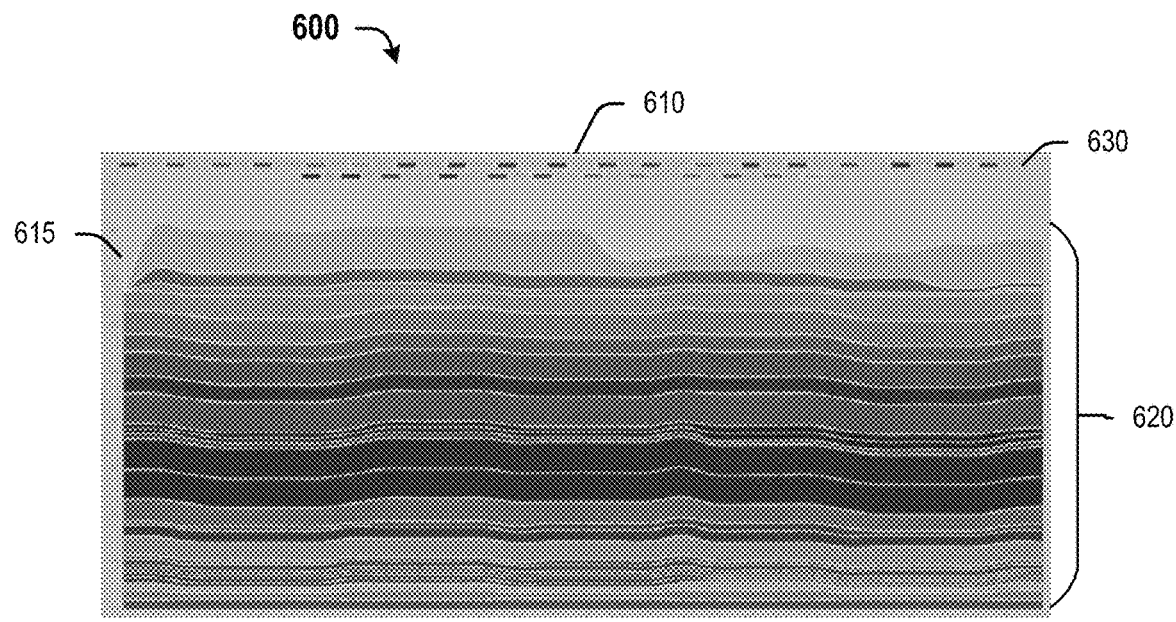
FIG. 6 is a further exemplary screenshot of a GUI associated with the operation of a diagnostic device, according to aspects of the present disclosure.

FIG. 6 shows another exemplary screenshot 600 of a GUI associated with the operation of a diagnostic device, such as diagnostic device 200, according to aspects of the present disclosure. The diagnostic device may be coupled to a communication link at physical location in a signal communication system that includes three network devices configured to operate as source or host elements. Screenshot 600 illustrates a single container 610. The container includes a display component 615 representing data or information from a set of media streams or signals. The components in screenshot 600 have been created and configured by an operator using the editing functions described in screenshots 400 and 500 above as part of a dashboard.

Container 610 has been configured as a fixed layout type container. Display component 615 has been configured as a child component to container 610. The target location for container 610 has been selected as "Source" and has been configured for location as "Choose all". In this configuration, container 610 will search and locate all data and information from any of the source elements in a signal communication system (e.g., broadcast content distribution system 100 in FIG. 1) and will serve as the source for all data or information that will be displayed in display component 615. The target location for display component 615 has been selected as "Service" (i.e., all selection boxes contain a check mark except "Stream") and is configured for location search by selecting "from parent" for the Source and "Choose all" for the remaining selected element. The configuration of display component 615 causes the location search to find signals or media streams Service level or higher element in the signal communication system.

As illustrated in screenshot 600, Display component 615 has been configured to display data using a history multi data chart in the element bit rate charts category of display type entries as described in FIG. 4. The history multi data chart displays the bit rates for each one of the signals or media streams 620 from any of the source elements in the signal communication system in a stacked arrangement. The history multi data chart has further been configured to color code each one 620, shown as different shading in screen 600, and include a legend 630 identifying each of the different signals or media streams. The location configuration created by the operator to generate container 610 and display component 615 resulted in all signals or media streams for all the source elements searched in container 610 were added to the same history multi data chart in display component 615.

Figure 7:
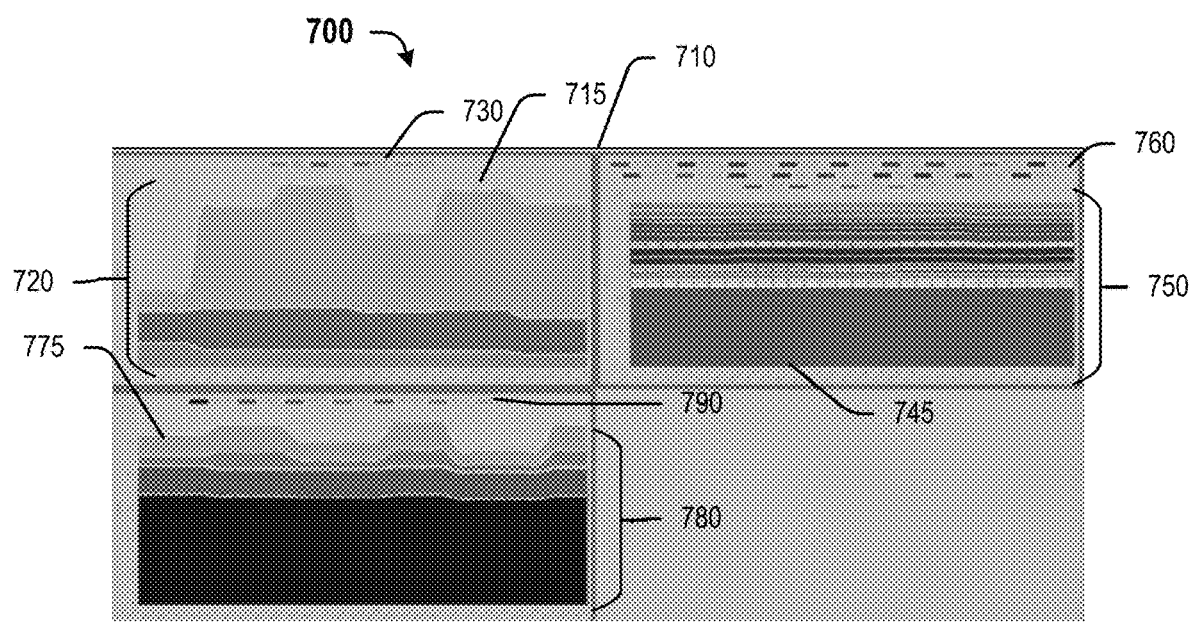
FIG. 7 is yet another exemplary screenshot of a GUI associated with the operation of a diagnostic device, according to aspects of the present disclosure.

FIG. 7 shows yet another exemplary screenshot 700 of a GUI associated with the operation of a diagnostic device, such as diagnostic device 200, according to aspects of the present disclosure. The diagnostic device may be coupled to a communication link in the same manner as described in FIG. 6. Screenshot 700 illustrates a container 710 that includes a set of display components 715, 745, and 775 representing data or information from a set of media streams or signals. The components in screenshot 700 have been created and configured by an operator in a manner different from screenshot 600 using the editing functions described in screenshots 400 and 500 above as part of a dashboard.

Container 710 has been configured as a template container rather than a fixed layout container as in FIG. 6. One display component 715 has been configured as a child component to container 710. The target location for container 710 has been selected as "Source" and has been configured for location as "Choose all" as in FIG. 6. The target location for display component 715 has been selected as "Service" and is configured for location search by selecting "from parent" or "Choose all" as in FIG. 6. The configuration again causes the location search to find all signals or media streams at all elements. However, due to the use of a template layout container instead of the fixed layout container as in FIG. 6, container 710 will find the three elements as sources and create and display two additional copies of display component 715, identified as display component 745 and display component 775. The source for each of the display components 715, 745, and 775 will be set to a different one of the source elements detected by container 710. The resultant location search for data by each one of the display components 715, 745, and 775 will find all the streams on only the one source element assigned to it by container 710.

As illustrated in screenshot 700, Display component 715 has been configured to display data using a history multi data chart in the element bit rate charts category as in FIG. 6. Display components 745 and 775 use the same configuration as a result of the presence of three source elements. The history multi data chart in display component 715 displays the bit rates for each one of the signals or media streams 620 from a first source element in the signal communication system. Further, the history multi data charts in display components 745 and 775 display the bit rates for each one of the signals or media streams 750 from a second source element and for each one of the signal or media streams 780 respectively. Display components 715, 745, and 775 each also include a color code legend 730, 760, and 790 for the signals or media streams as in FIG. 6.

The configuration created by the operator and displayed in screenshot 700 differs from the configuration created and displayed in screenshot 600 as a result of configuring container 710 in screenshot 700 to use a template layout container instead of the fixed layout container used in container 610. As a result, screenshot 700 produces a container 710 that shows the signals or media streams of each of the three source elements in three different display components 715, 745, and 775.

It is worth noting that the configuration of container 710 may allow any changes to the configuration of display components 715, 745, and 775 to be linked. Display components 745 and 775 are copies of display component 715 and, as such, may be considered children of display component 715. All of these containers are also children of the parent container 710. As a result, any changes made to one of the display components (e.g., display component 715) may also be applied automatically to the sibling display components (e.g., display components 745 and/or 775).

Figure 8:
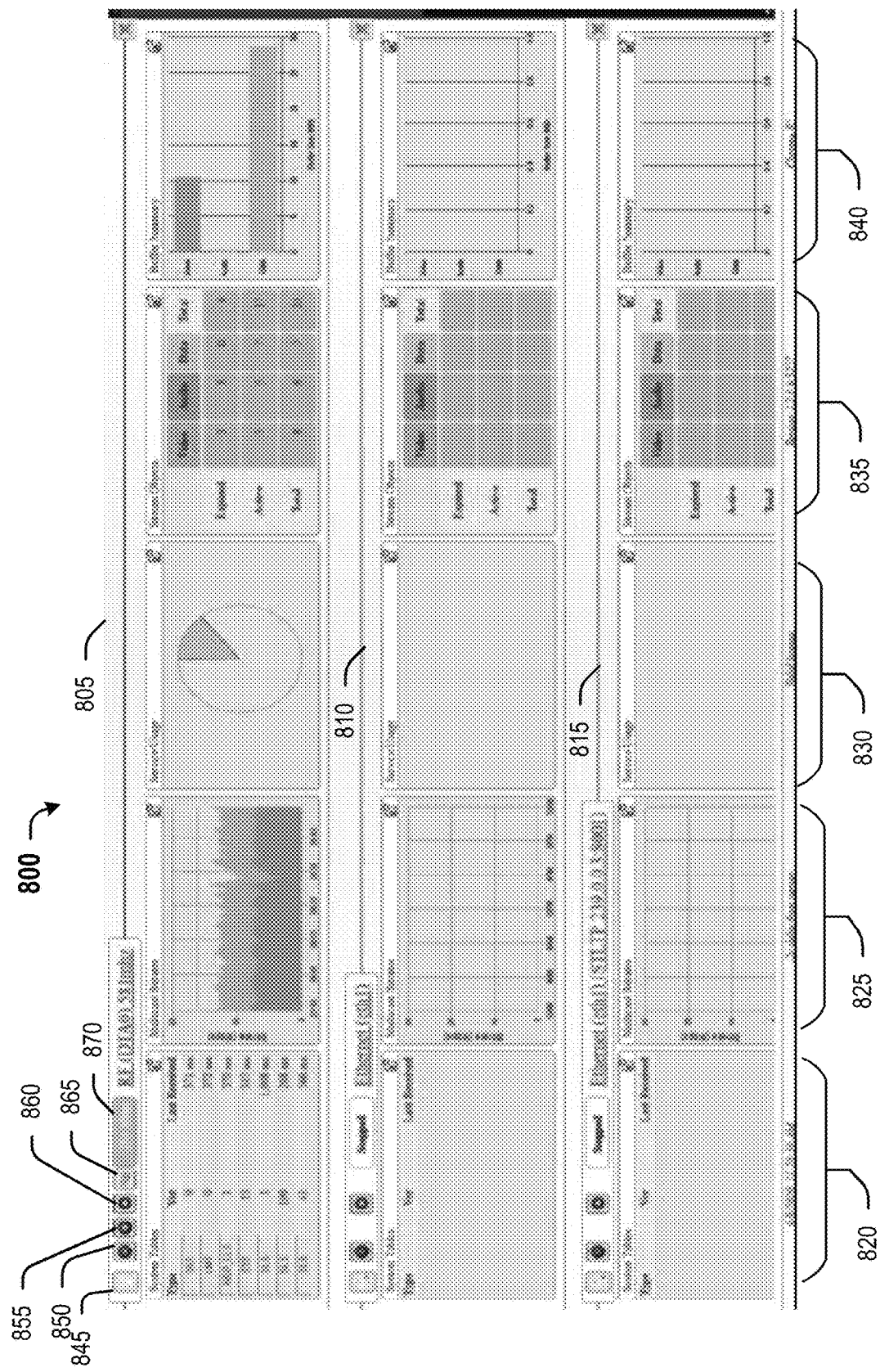
FIG. 8 is still a further exemplary screenshot of a GUI associated with the operation of a diagnostic device, according to aspects of the present disclosure.

FIG. 8 shows still a further exemplary screenshot 800 of a GUI associated with the operation of a diagnostic device, such as diagnostic device 200, according to aspects of the present disclosure. Screenshot 800 illustrates a dashboard that includes a series of three panels (i.e., containers) 805, 810, 815 arranged vertically. Each of the panels 805, 810, 815 includes five containers with each container including a display component. The components in screenshot 800 have been created and configured by an operator using the editing functions described in screenshots 400 and 500 above as part of a dashboard.

Each of the panels 805, 810, 815 have been configured to display a set of characteristics of media streams from different elements in a signal communication system (e.g., broadcast content distribution system 100 in FIG. 1). As shown, panel 805 displays characteristics associated with a first media stream labeled as "TF (DTA0) 581 mhz". Panel 810 displays characteristics associated with a second media stream that is related to the first media stream in dashboard 805, labeled as "Ethernet (eth1)". Panel 815 displays characteristics associated with a third media stream that is related to both the first and second media stream, labeled as Ethernet (eth1) (STLTP239.0.0.3:8001). The relationships between the three media streams may be established based on configuration by an operator. In some embodiments, the media stream in dashboard 815 may be a transport stream that is tuned from the media stream, as an RF data signal, displayed in dashboard 805. The media streams that are displayed in dashboard 805 and dashboard 815 are monitored at the same physical or geographical location. As such, the media stream displayed in dashboard 815 may be referred to as a sub-stream or child stream of the media stream that is displayed in dashboard 805. Further, the media stream displayed in dashboard 810 is the same media stream as the media stream displayed in dashboard 815 but is monitored at a second physical or geographical location that is different from the above mentioned physical or geographical location. As such, the media stream display in dashboard is a sibling stream of the media stream displayed in dashboard 815 and is also a sub-stream or child stream of the media stream that is displayed in dashboard 805.

The five display components in each one of panels 805, 810, and 815, grouped as display components 820, 825, 830, 835, and 840, have been configured to display a representation of the same set of characteristics for the respective media streams. The group of display components 820 has been configured to display data using a table chart in the ATSC 3.0. The table chart shows a list of system tables, indicating the version and the time from last received for the respective media streams. The group of display components 825 has been configured to display data using a history multi data chart in the element bit rate charts category. The history multi data chart displays the multicast bit rates for the respective media streams. The group of display components 830 has been configured to display data using a pie chart in the ATSC 3.0 category. The pie chart shows a breakdown of service usage for the respective media streams. The group of display components 835 has been configured to display data using a block chart in the ATSC 3.0 category. The block chart shows a breakdown of type and number of stream objects received. The group of display components 840 has been configured to display data using a bar chart in the ATSC 3.0 category. The bar chart shows the buffer size used by the three different types of stream objects received.

In some embodiments, one or more characteristics may be generated and displayed in a display component included in one or more of the panels 805, 810, and 815. The characteristics may be generated as a result of analysis performed on the media stream in the diagnostic device (e.g., diagnostic device 200) using the "Rules" selection in display category list 455 and a combination of one or more display type entries 460 as described earlier. For example, the display components 825 may be configured, using the rules category, to compare the multicast bitrates for each of the three media streams used in panels 805, 810, and 815. Further, the generated characteristics may include threshold or boundary values for the data or information. One or more attributes of a display component may be configured to provide an indication of a threshold or boundary value violation. For example, display components 825 may be configured with a high level threshold value for multicast bitrate. If the high threshold value is exceeded or violated by one or more of the media streams, the border color of display component(s) 825 for that media stream may be changed. The border color may be red when the threshold is currently violated, yellow for when the threshold was previously violated but now is not, and green if the threshold has not been violated. In some embodiments, threshold or boundary violations may further be recorded with a timestamp and available for later review by the operator.

Each of panels 805, 810, and 815 may also be configured to include a set of indicators and control buttons for use in monitoring and controlling the display of data associated with the respective media streams. As shown, panel 805 is currently displaying its received media stream. Panel 805 includes a link indicator 845. Link indicator 845 shows the link for the received signal as a wireless communication link. Panels 810 and 815 include link indicators corresponding to link indicator 845 that show the link for the received signal as a wired network link. Panel 805 also includes a start button 850 and a stop button 855 for starting and stopping the display and/or recording of the data for the media stream. Dashboard 805 also includes a status indicator 870 that shows the bit rate for the received media stream when start button 850 is selected. Panels 810 and 815 are not displaying data for their respective received media streams, with their status indicators corresponding to indicator 870 showing "Stopped". Panels 810 and 815 also include only a start button while not displaying data.

Panel 805 also includes a select button 860 that operates in a manner similar to the select button 435 described in FIG.

4. It is worth noting that panels 810 and 815 also include a select button corresponding to select button 860. In some embodiments, depending on the configuration of panel 805 and its components, any changes made to the display components in any of the panels may be automatically applied to the display components in the other panels based on the hierarchical relationship of the components as a result of the relationships between the media streams. Button 870 is a visual indicator in the analyzer that will show or indicate if that input/transport is actively being processed. An operator can start/stop the analysis on an input. When stopped, that indicator is black and contains the text "Stopped". When processing, that indicator is Green and contains text which shows the bitrate of the transport being processed.

Figure 9:
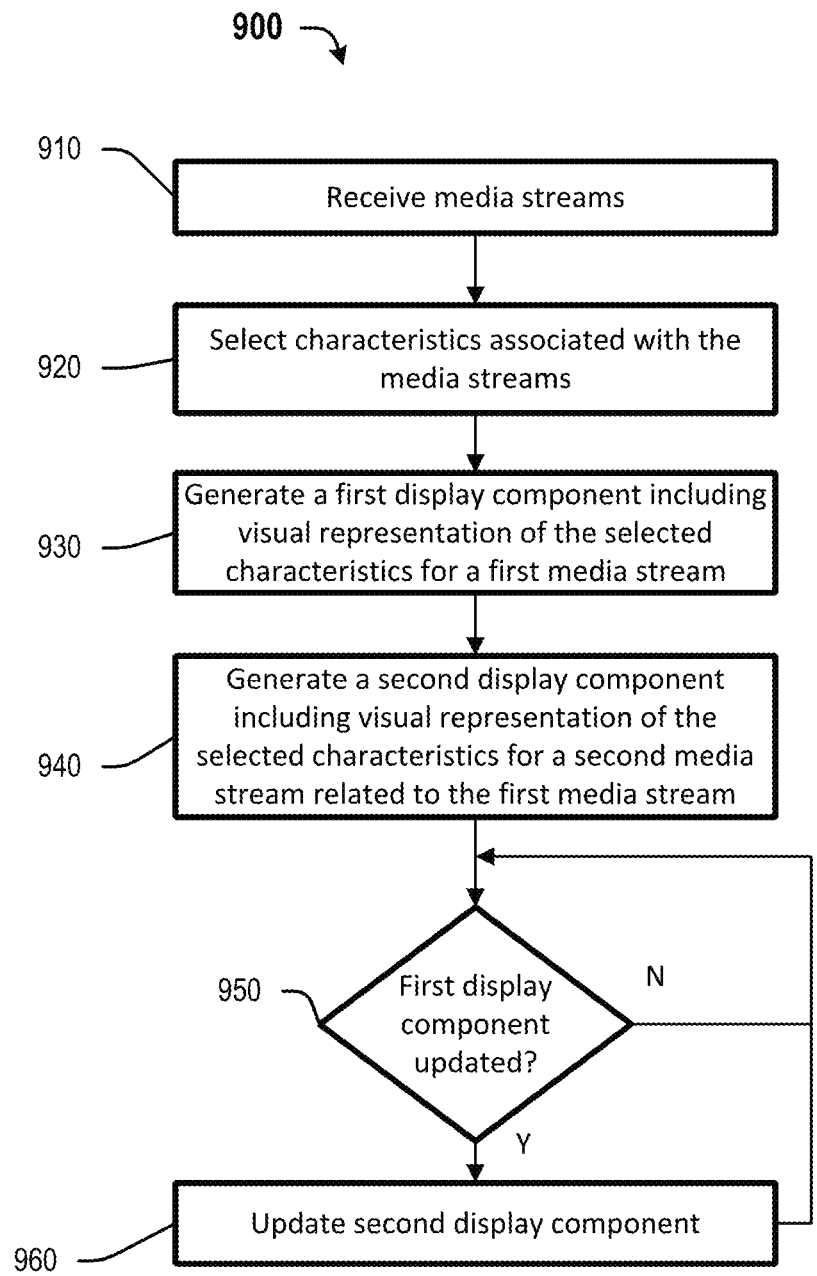
FIG. 9 is a flow chart of an exemplary process for visual monitoring media streams in a signal communication system, according to aspects of the present disclosure.

FIG. 9 illustrates a flow chart of an exemplary process 900 for visual monitoring media streams in a signal communication system according to aspects of the present disclosure. Process 900 will be primarily described with respect to the diagnostic device 200 described in FIG. 2. One or more aspects of process 900 may equally apply to the broadcast content diagnostic device 190 as part of broadcast content distribution system 100 described in FIG. 1. Further, one or of the steps of process 900 may be implemented as part of a GUI included in the diagnostic device, such as the GUI described in FIGS. 4-8. Although process 900 depicts steps performed in a particular order for purposes of illustration and discussion, the operations discussed herein are not limited to any particular order or arrangement.

At step 910, one or more media streams are received. The received media stream(s) may be part of one or more signals received at a signal input interface of the diagnostic device (e.g., signal interface 210, receiver 220, and/or local network interface 230). The diagnostic device may be electrically coupled into any physical component or into any communication link in the signal communication system. The diagnostic device is capable of monitoring and/or analyzing the media stream(s) at a plurality of locations as elements in the signal communication system. The media stream(s) may be any one or more of elementary streams, service streams, transport streams, or PHY layer streams as described above. For example, the media stream(s) may be service streams that comply with the ATSC 3.0 standard and used in a broadcast communication system, such as broadcast content distribution system 100 in FIG. 1. Also, at step 910, the signal is provided to the processor 240 for further processing and/or analysis.

At step 920, one or more characteristics associated with the one or more media stream(s) that were received, at step 910, are selected in response to an input from an operator on the diagnostic device. The input from the operator is entered through a user input device connected to a user interface (e.g., user input interface 270) and provided to a processor (e.g., processor 240) for incorporation as part of a GUI, such as the GUI described above. The signal from the user input, representing the input from the operator, is provided to a processor or controller (e.g., processor 240) for processing data in the media stream(s) based on the selected characteristic(s). In some embodiments, the processor or controller provides the selected characteristics and the processed data for incorporation as part of a GUI, such as the GUI described above.

At step 930, a first display component is generated for display in the diagnostic device. The first display component includes a visual representation of the selected characteristic(s) for a first received media stream that is one of the media streams received, at step 910. The generating of the first display component is performed in the processor or controller (e.g., processor 240) using the processed data for the selected characteristic(s) of the first media stream and is provided as a signal for display through an output interface or display interface (e.g., output interface 280). In some embodiments, the first display component is generated, configured, and provided for display as part of a GUI as described above.

It is worth noting that the selection of one or more characteristics, at step 920, and the generation of the first display element, at step 930, may be performed in response to the same input from the operator. In other words, the selection of a characteristic will also effectively generate the first display element. Alternatively, the generation of the first display element, at step 930, may occur as the result of some additional input from the operator, in a manner similar to the selection, at step 930.

At step 940, a second display component is generated for display in the diagnostic device. The second display component includes a visual representation of the characteristic(s), selected at step 920, for a second received media stream that is related to the first received media stream. The second display element is generated in a manner similar to that described for generating the first display component, at step 930. In some embodiments, the relationship between the first media stream and the second media stream may be identified by the diagnostic device. In some embodiments, the relationship may be established based on inputs from the operator. For example, a hierarchical relationship (e.g., a tree node hierarchy) may exist between the first media stream and the second media stream. The relationship information is provided to the processor that incorporates a GUI. The GUI can generate a corresponding link between the first display component and the second display component based on the relationship information. It is worth noting that, the second display element and the first display element may be combined and provided in the same signal for display through the output interface or display interface, such as part of the same GUI.

Several types of relationships between the first media stream and the second media stream may exist and/or may be created and configured. In some embodiments, the second media stream may be a media sub-stream of the first media stream. For example, the first media stream may be a service stream and the second media stream may be a video content stream within the service stream. In some embodiments, the first media stream and the second media stream are the same, but the second media stream may have one or more characteristics monitored at a location that is different from the monitoring location for the same characteristics of the first media stream. In some embodiments, the second media stream may have the same signal format and/or signal parameters as the first media stream but contain media content and/or data that is not the same. For example, both the first media stream and the second media stream may be MPEG 2 video streams, but the first media stream is part of a first service stream from a first content source and the second media stream is part of a different service from a second content source.

In some embodiments, step 940 may also include analyzing the processed data from one or more of the characteristics(s) displayed in the first display component for the first media stream and/or processed data from one or more characteristics displayed in the second display component for the first media stream. The analysis may be performed by the processor or controller (e.g., processor 240). The analysis may include identifying and/determining thresholds for proper operation. The analysis may additionally, or alternatively, include comparing the processed data for the characteristics displayed in the first display component and the second display component.

In some embodiments, the processor or controller may further provide a notification to the operator based on the analysis, such as the comparison described above. For example, a notification may be provided if a comparison between the processed data for a bit error rate displayed in the first display component and the processed data for the bit error rate displayed in the second display is different by more than 10 percent. The notification may be provided through the GUI and shown as a change in some attribute of one or both of the first display component and the second display component. Additionally, or alternatively, a notification may be generated by the processor or controller (e.g., processor 240) to other components in the signal communication system (e.g., studio content processing system 105 in FIG. 1) through, a network interface (e.g., network interface 230). The notification may include the nature of the results of the analysis or comparison, the error that has been identified, or other information relevant to proper operation of the signal communication system.

At step 950, a determination is made as to whether or not an update to the first display component has occurred. The determination is performed by the processor or controller (e.g., processor 240) during the generation of the first display component, such as by comparing previous versions of the first display component. The update may include any or all changes made to parameters related to the characteristic(s) that are part of generating the first display component, at step 930. The update may also include a change in the characteristic(s) that have been selected, at step 920. In some embodiments, a processor incorporating a GUI may identify user inputs that are directed at changing an attribute in the first display component.

If, at step 950 the determination is made that an update to the first display component has occurred, then, at step 960, the second display component is updated in response to the change in the first display element. The update may include the changes made to any attributes or characteristics that were changed in the first display component. The update to the second display component is performed as a result of the relationship link between the first display component and the second display component that was generated, at step 940, based on the relationship of the first media stream and the second media stream. After the second display is updated, step 960, or if a determination is made, at step 950, that update to the first display component has not occurred, then process 900 returns to determining when an update to the first display component occurs, at step 950.

It is worth noting that one or more of the steps of process 900 may be modified, steps may be added or omitted depending on a specific embodiment. In some embodiments, an additional step may be added to process 900 for generating another, third display component in the GUI in response to a third user input in a manner similar to the generating at step 940. The third display component includes a visual representation of at least one characteristic for a third received media stream that is related to the second media stream, which may further be related to the first received media stream as described above. The relationship between the third media stream, the second media stream and/or the first media stream may be established based on inputs from the operator through a GUI which may generate a corresponding link between the third display component, the second display, and/or the first display component based on the relationship information. The third display element may be dynamically updated based on the determination that a change has occurred in the first display element in a manner similar to that described in steps 950 and 960.

It is to be appreciated that although the embodiments described above focus on physical hardware and elements within a signal communication system, the principles of the present disclosure may be easily extended to implementations that involve software based programming that are stored in a computer readable medium, such as a magnetic optical based storage structure. Further, in some embodiments, one or more of the elements of a process based on the principles of the present disclosure, such as process 900 described may be implemented utilizing cloud-based operations and/or storage. It is to be appreciated that, except where explicitly indicated in the description above, the various features included as part of the principles of the present disclosure can be considered cumulative and interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments for system and method for visually monitoring media streams, it is noted that modifications and variations can be made by persons skilled in the art in light of the above teachings. It is therefore to be understood that changes may be made in the particular embodiments of the disclosure which are within the scope of the disclosure as outlined by the appended claims.

The invention claimed is:

1. An apparatus for dynamically monitoring at least one media stream in a signal communication system, comprising:
   an input interface that receives at least one media stream, wherein the at least one media stream is capable of being monitored at a plurality of locations;
   a memory coupled to the input interface; and
   a processor coupled to the input interface and the memory, the processor configured to:
      select at least one of a (i) characteristic and (ii) operational parameter associated with the at least one media stream in response to a first user input;
      generate for display a first display component in a graphical user interface (GUI), the first display component including a visual representation of the at least one of the (i) characteristic and (ii) operational parameter for a first received media stream; and
      generate for display a second display component in the GUI in response to a second user input, the second display component including a visual representation of the at least one of the (i) characteristic and (ii) operational parameter for a second received media stream that is related to the first received media stream;
      wherein th at least one of the (i) characteristic and (ii) operational parameter for the first received media stream is associated with the at least one of the (i) characteristic and (ii) operational parameter for the second received media stream; and
      wherein the visual representation of the second display component is dynamically updated in response to a change in the visual representation of the first display component.

2. The apparatus of claim 1, wherein the at least one media stream includes at least one of an audio stream, a video stream, a program and system information protocol (PSIP) stream, and an internet protocol (IP) stream.

3. The apparatus of claim 1, wherein the at least one media stream includes at least one of a radio frequency broadcast stream, a transport stream, and a service stream.

4. The apparatus of claim 1, wherein the signal communication system is a broadcast content distribution system.

5. The apparatus of claim 4, wherein the at least one media stream complies with the advanced transmission standards committee (ATSC) standard ATSC 3.0.

6. The apparatus of claim 1, wherein the second received media stream is a media sub-stream of the first received media stream.

7. The apparatus of claim 6, wherein the processor further generates for display a third display component in the GUI in response to a third user input, the third display component including a visual representation of the at least one of the (i) characteristic and (ii) operational parameter of a third received media stream that is related to the media sub-stream of the first received media stream and wherein the third display component is dynamically updated in response to a change in the second display component.

8. The apparatus of claim 1, wherein the second received media stream has the same format and parameters as the first received media stream but contains different content.

9. The apparatus of claim 1, wherein the first received media stream is monitored at a first location and wherein the second received media stream is monitored at a second location that is different from the first location.

10. The apparatus of claim 1, wherein, in response to comparing the information displayed in the first display component to the information displayed in the second display component, the processor further provides a notification to the signal communication system.

11. A method for dynamically monitoring at least one media stream in a signal communication system, comprising:
receiving at least one media stream, wherein the at least one media stream is capable of being monitored at a plurality of locations;
selecting at least one of a (i) characteristic and (ii) operational parameter associated with the at least one media stream in response to a first user input;
generating for display a first display component in a GUI, the first display component including a visual representation of the at least one of the (i) characteristic and (ii) operational parameter for a first received media stream; and
generating for display a second display component in the GUI in response to a second user input, the second display component including a visual representation of the at least one of the (i) characteristic and (ii) operational parameter for a second received media stream that is related to the first received media stream;
wherein the at least one of the (i) characteristic and (ii) operational parameter for the first received media stream is associated with the at least one of the (i) characteristic and (ii) operational parameter for the second received media stream; and
wherein the second display component is dynamically updated in response to a change in the first display component.

12. The method of claim 11, wherein the at least one media stream includes at least one of an audio stream, a video stream, a PSIP stream, and an IP stream.

13. The method of claim 11, wherein the at least one media stream includes at least one of a radio frequency broadcast stream, a transport stream, and a service stream.

14. The method of claim 11, wherein the signal communication system is a broadcast content distribution system.

15. The method of claim 14, wherein the at least one media stream complies with the ATSC standard ATSC 3.0.

16. The method of claim 11, wherein the second received media stream is a media sub-stream of the first received media stream.

17. The method of claim 16, further comprising generating for display a third display component in the GUI in response to a third user input, the third display component including a visual representation of the at least one of the (i) characteristic and (ii) operational parameter for a third received media stream that is related to the media sub-stream of the first received media stream and wherein the third display component is dynamically updated in response to a change in the first display component.

18. The method of claim 11, wherein the second received media stream has the same format and parameters as the first received media stream but contains different content.

19. The method of claim 11, wherein the first received media stream is monitored at a first location and wherein the second received media stream is monitored at a second location that is different from the first location.

20. A non-transitory computer-readable medium having stored thereon a set of programming instructions that, when executed by at least one processor, performs the steps of:
receiving at least one media stream, the at least one media stream capable of being monitored at a plurality of locations;
selecting at least one of a (i) characteristic a nd (ii) operational parameter associated with the at least one media stream in response to a first user input;
generating for display a first display component in a GUI, the first display component including a visual representation of the at least one of the (i) characteristic and (ii) operational arameter of a first received media stream; and
generating for display a second display component in the GUI in response to a second user input, the second display component including a visual representation of the at least one of the (i) characteristic and (ii) operational parameter of a second received media stream that is related to the first received media stream;
wherein the at least one of the (i) characteristic and (ii) operational parameter for the first received media stream is associated with the at least one of the (i) characteristic and (ii) operational parameter for the second received media stream; and
wherein the second display component is dynamically updated in response to a change in the first display component.

* * * * *